(12) United States Patent
Liu et al.

(10) Patent No.: US 7,446,041 B2
(45) Date of Patent: Nov. 4, 2008

(54) FULL SEQUENCE METAL AND BARRIER LAYER ELECTROCHEMICAL MECHANICAL PROCESSING

(75) Inventors: Feng Q. Liu, San Jose, CA (US); Liang-Yuh Chen, Foster City, CA (US); Stan D. Tsai, Fremont, CA (US); Yongqi Hu, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 195 days.

(21) Appl. No.: 11/425,682

(22) Filed: Jun. 21, 2006

(65) Prior Publication Data

US 2006/0260951 A1 Nov. 23, 2006

Related U.S. Application Data

(63) Continuation of application No. 10/941,060, filed on Sep. 14, 2004, now Pat. No. 7,084,064.

(51) Int. Cl.
*H01L 21/44* (2006.01)

(52) U.S. Cl. .................. 438/678; 438/694; 438/702

(58) Field of Classification Search .......... 438/678, 438/694, 702, 703, 729, 739, 742, 747
See application file for complete search history.

(56) References Cited

U.S. PATENT DOCUMENTS

| | | | |
|---|---|---|---|
| 1,601,642 A | 9/1926 | Parker | |
| 1,927,162 A | 9/1933 | Fladler et al. | |
| 2,112,691 A | 3/1938 | Crowder | |
| 2,240,265 A | 4/1941 | Nachtman | |
| 2,392,687 A | 1/1946 | Nachtman | |
| 2,431,065 A | 11/1947 | Miller | |
| 2,451,341 A | 10/1948 | Jemstedt | |
| 2,453,481 A | 11/1948 | Wilson | |
| 2,454,935 A | 11/1948 | Miller | |
| 2,456,185 A | 12/1948 | Grube | |
| 2,457,510 A | 12/1948 | van Omum | |
| 2,458,676 A | 1/1949 | Brenner et al. | |

(Continued)

FOREIGN PATENT DOCUMENTS

DE 3413762 A1 5/1983

(Continued)

OTHER PUBLICATIONS

D. Landolt, "Fundamental Aspects of Electropolishing", Mar. 18, 1996, pp. 1-11.

(Continued)

*Primary Examiner*—Phuc T Dang
(74) *Attorney, Agent, or Firm*—Patterson & Sheridan

(57) ABSTRACT

A method and apparatus for electrochemically processing metal and barrier materials is provided. In one embodiment, a method for electrochemically processing a substrate includes the steps of establishing an electrically-conductive path through an electrolyte between an exposed layer of barrier material on the substrate and an electrode, pressing the substrate against a processing pad assembly, providing motion between the substrate and pad assembly in contact therewith and electrochemically removing a portion of the exposed layer during a first electrochemical processing step in a barrier processing station.

13 Claims, 10 Drawing Sheets

U.S. PATENT DOCUMENTS

| | | |
|---|---|---|
| 2,461,556 A | 2/1949 | Lorig |
| 2,473,290 A | 8/1949 | Millard |
| 2,477,808 A | 8/1949 | Jones |
| 2,479,323 A | 8/1949 | Davie |
| 2,480,022 A | 8/1949 | Hogaboom |
| 2,490,055 A | 12/1949 | Hoff |
| 2,495,695 A | 1/1950 | Camin et al. |
| 2,500,205 A | 3/1950 | Schaefer |
| 2,500,206 A | 3/1950 | Schaefer et al. |
| 2,503,863 A | 4/1950 | Bart |
| 2,506,794 A | 5/1950 | Kennedy et al. |
| 2,509,304 A | 5/1950 | Klein |
| 2,512,328 A | 6/1950 | Hays |
| 2,517,907 A | 8/1950 | Mikulas |
| 2,519,945 A | 8/1950 | Twele et al. |
| 2,530,677 A | 11/1950 | Berkenkotter et al. |
| 2,535,966 A | 12/1950 | Teplitz |
| 2,536,912 A | 1/1951 | Coberti |
| 2,539,896 A | 1/1951 | Davis |
| 2,540,175 A | 2/1951 | Rosenqvist |
| 2,544,510 A | 3/1951 | Prahl |
| 2,549,678 A | 4/1951 | Flandt |
| 2,544,943 A | 5/1951 | Welty |
| 2,556,017 A | 6/1951 | Vonada |
| 2,560,534 A | 7/1951 | Adler |
| 2,560,966 A | 7/1951 | Lee |
| 2,569,577 A | 10/1951 | Reading |
| 2,569,578 A | 10/1951 | Rieger |
| 2,571,709 A | 10/1951 | Gray |
| 2,576,074 A | 11/1951 | Nachtman |
| 2,582,020 A | 1/1952 | Emery |
| 2,587,630 A | 3/1952 | Konrad et al. |
| 2,619,454 A | 11/1952 | Zapponi |
| 2,633,452 A | 3/1953 | Hogaboom, Jr. et al. |
| 2,646,398 A | 7/1953 | Henderson |
| 2,656,283 A | 10/1953 | Fink et al. |
| 2,656,284 A | 10/1953 | Toulmin |
| 2,657,177 A | 10/1953 | Rendel |
| 2,657,457 A | 11/1953 | Toulmin |
| 2,673,836 A | 3/1954 | Vonada |
| 2,674,550 A | 4/1954 | Dunlavy et al. |
| 2,675,348 A | 4/1954 | Greenspan |
| 2,680,710 A | 6/1954 | Kenmore et al. |
| 2,684,939 A | 7/1954 | Gesse |
| 2,689,215 A | 9/1954 | Bart |
| 2,695,269 A | 11/1954 | de Witz et al. |
| 2,695,859 A | 12/1954 | Somma |
| 2,698,832 A | 1/1955 | Swanson |
| 2,706,173 A | 4/1955 | Welks et al. |
| 2,706,175 A | 4/1955 | Licharz |
| 2,708,445 A | 5/1955 | Manson et al. |
| 2,710,834 A | 6/1955 | Vrilakas |
| 2,711,993 A | 6/1955 | Lyon |
| 3,162,588 A | 12/1964 | Bell |
| 3,239,441 A | 3/1966 | Maroal |
| 3,334,041 A | 8/1967 | Dyer et al. |
| 3,433,730 A | 3/1969 | Kennedy et al. |
| 3,448,023 A | 6/1969 | Bell |
| 3,478,677 A | 11/1969 | Corley et al. |
| 3,607,707 A | 9/1971 | Chenevler |
| 3,873,512 A | 3/1975 | Latanislon |
| 3,942,959 A | 3/1976 | Markoo et al. |
| 3,992,178 A | 11/1976 | Markoo et al. |
| 4,047,902 A | 9/1977 | Wiand |
| 4,082,638 A | 4/1978 | Jumer |
| 4,119,515 A | 10/1978 | Costakis |
| 4,125,444 A | 11/1978 | Inoue |
| 4,263,113 A | 4/1981 | Bernard |
| 4,523,411 A | 6/1985 | Freerks |
| 4,663,005 A | 5/1987 | Edson |
| 4,666,683 A | 5/1987 | Brown et al. |
| 4,704,511 A | 11/1987 | Miyano |
| 4,713,149 A | 12/1987 | Hoshino |
| 4,752,371 A | 6/1988 | Kreisel et al. |
| 4,772,361 A | 9/1988 | Dorsett et al. |
| 4,793,895 A | 12/1988 | Kaanta et al. |
| 4,839,993 A | 6/1989 | Masuko et al. |
| 4,934,102 A | 6/1990 | Leach et al. |
| 4,954,141 A | 9/1990 | Takiyama et al. |
| 4,956,056 A | 9/1990 | Zubatova et al. |
| 4,992,135 A | 2/1991 | Doan |
| 5,002,645 A | 3/1991 | Eastland et al. |
| 5,061,294 A | 10/1991 | Harmer et al. |
| 5,066,370 A | 11/1991 | Andreshak et al. |
| 5,096,550 A | 3/1992 | Mayer et al. |
| 5,108,463 A | 4/1992 | Buchanan |
| 5,114,548 A | 5/1992 | Rhoades |
| 5,129,981 A | 7/1992 | Wang et al. |
| 5,136,817 A | 8/1992 | Tabata et al. |
| 5,137,542 A | 8/1992 | Buchanan |
| 5,209,816 A | 5/1993 | Yu et al. |
| 5,217,586 A | 6/1993 | Datta et al. |
| 5,225,034 A | 7/1993 | Yu et al. |
| 5,256,565 A | 10/1993 | Bernhardt et al. |
| 5,257,478 A | 11/1993 | Hyde et al. |
| 5,340,370 A | 8/1994 | Cadien et al. |
| 5,391,258 A | 2/1995 | Branacaleoni et al. |
| 5,407,526 A | 4/1995 | Danielson et al. |
| 5,478,435 A | 12/1995 | Murphy et al. |
| 5,534,106 A | 7/1996 | Cote et al. |
| 5,543,032 A | 8/1996 | Datta et al. |
| 5,560,753 A | 10/1996 | Schnabel et al. |
| 5,562,529 A | 10/1996 | Kishii et al. |
| 5,567,300 A | 10/1996 | Datta et al. |
| 5,575,706 A | 11/1996 | Tsai et al. |
| 5,578,362 A | 11/1996 | Reinhardt et al. |
| 5,624,300 A | 4/1997 | Kishii et al. |
| 5,633,068 A | 5/1997 | Ryoke et al. |
| 5,637,031 A | 6/1997 | Chen |
| 5,654,078 A | 8/1997 | Ferronato |
| 5,702,811 A | 12/1997 | Ho et al. |
| 5,738,574 A | 4/1998 | Tolles et al. |
| 5,766,446 A | 6/1998 | Spindt et al. |
| 5,770,095 A | 6/1998 | Sasaki et al. |
| 5,783,489 A | 7/1998 | Kaufman et al. |
| 5,804,507 A | 9/1998 | Perlov et al. |
| 5,807,165 A | 9/1998 | Uzoh et al. |
| 5,823,854 A | 10/1998 | Chen |
| 5,840,629 A | 11/1998 | Carpio |
| 5,846,882 A | 12/1998 | Birang |
| 5,866,031 A | 2/1999 | Carpio et al. |
| 5,871,392 A | 2/1999 | Meikle et al. |
| 5,880,003 A | 3/1999 | Hayashi |
| 5,882,491 A | 3/1999 | Wardle |
| 5,893,796 A | 4/1999 | Birang et al. |
| 5,897,375 A | 4/1999 | Watts et al. |
| 5,911,619 A | 6/1999 | Uzoh et al. |
| 5,931,719 A | 8/1999 | Nagahara et al. |
| 5,938,801 A | 8/1999 | Robinson |
| 5,948,697 A | 9/1999 | Hata |
| 5,954,997 A | 9/1999 | Kaufman et al. |
| 5,966,151 A | 10/1999 | Wakahara |
| 5,985,093 A | 11/1999 | Chen |
| 6,001,008 A | 12/1999 | Fujimori et al. |
| 6,001,730 A | 12/1999 | Farkas et al. |
| 6,004,880 A | 12/1999 | Liu et al. |
| 6,010,395 A | 1/2000 | Nakajima |
| 6,017,265 A | 1/2000 | Cook et al. |
| 6,020,264 A | 2/2000 | Lustig et al. |
| 6,024,630 A | 2/2000 | Shendon et al. |
| 6,033,293 A | 3/2000 | Crevasse et al. |
| 6,051,116 A | 4/2000 | Ichinose et al. |
| 6,056,851 A | 5/2000 | Hsieh et al. |
| 6,056,864 A | 5/2000 | Cheung |

| | | | | | | | |
|---|---|---|---|---|---|---|---|
| 6,063,306 | A | 5/2000 | Kaufman et al. | 6,395,152 | B1 | 5/2002 | Wang |
| 6,066,030 | A | 5/2000 | Uzoh | 6,402,591 | B1 | 6/2002 | Thornton |
| 6,068,818 | A | 5/2000 | Ackley et al. | 6,406,363 | B1 | 6/2002 | Xu et al. |
| 6,074,284 | A | 6/2000 | Tani et al. | 6,409,904 | B1 | 6/2002 | Uzoh et al. |
| 6,077,337 | A | 6/2000 | Lee | 6,413,388 | B1 | 7/2002 | Uzoh et al. |
| 6,077,412 | A | 6/2000 | Ting et al. | 6,413,403 | B1 | 7/2002 | Lindquist et al. |
| 6,083,840 | A | 7/2000 | Mravic et al. | 6,416,685 | B1 | 7/2002 | Zhang et al. |
| 6,090,239 | A | 7/2000 | Liu et al. | 6,419,554 | B2 | 7/2002 | Chopra et al. |
| 6,096,652 | A | 8/2000 | Watts et al. | 6,428,394 | B1 | 8/2002 | Mooring et al. |
| 6,099,604 | A | 8/2000 | Sandhu et al. | 6,428,721 | B1 | 8/2002 | Ina et al. |
| 6,103,096 | A | 8/2000 | Datta et al. | 6,429,133 | B1 | 8/2002 | Chopra |
| 6,106,728 | A | 8/2000 | Iida et al. | 6,431,968 | B1 | 8/2002 | Chen et al. |
| 6,116,998 | A | 9/2000 | Damgaard et al. | 6,440,186 | B1 | 8/2002 | Sakai et al. |
| 6,117,775 | A | 9/2000 | Kondo et al. | 6,440,295 | B1 | 8/2002 | Wang |
| 6,117,783 | A | 9/2000 | Small et al. | 6,447,371 | B2 | 9/2002 | Brusic Kaufman et al. |
| 6,117,853 | A | 9/2000 | Sakai et al. | 6,447,668 | B1 | 9/2002 | Wang |
| 6,126,853 | A | 10/2000 | Kaufman et al. | 6,454,819 | B1 | 9/2002 | Yano et al. |
| 6,141,027 | A | 10/2000 | Akutsu et al. | 6,455,479 | B1 | 9/2002 | Sahbari |
| 6,143,155 | A | 11/2000 | Adams et al. | 6,468,413 | B1 | 10/2002 | Fanti et al. |
| 6,143,656 | A | 11/2000 | Yang et al. | 6,471,847 | B2 | 10/2002 | Talieh et al. |
| 6,153,043 | A | 11/2000 | Edelstein et al. | 6,475,332 | B1 | 11/2002 | Boyd et al. |
| 6,156,124 | A | 12/2000 | Tobin | 6,479,962 | B2 | 11/2002 | Ziemkowski et al. |
| 6,159,079 | A | 12/2000 | Zuniga et al. | 6,482,307 | B2 | 11/2002 | Ashjaee et al. |
| 6,171,352 | B1 | 1/2001 | Lee et al. | 6,497,800 | B1 | 12/2002 | Talieh et al. |
| 6,171,467 | B1 | 1/2001 | Weihs et al. | 6,508,952 | B1 | 1/2003 | Lee et al. |
| 6,176,992 | B1 | 1/2001 | Talieh | 6,517,426 | B2 | 2/2003 | Lee |
| 6,176,998 | B1 | 1/2001 | Wardle et al. | 6,520,843 | B1 | 2/2003 | Halley |
| 6,177,026 | B1 | 1/2001 | Wang et al. | 6,537,140 | B1 | 3/2003 | Miller et al. |
| 6,183,354 | B1 | 2/2001 | Zuniga et al. | 6,537,144 | B1 | 3/2003 | Tsai et al. |
| 6,190,237 | B1 | 2/2001 | Huyng et al. | 6,551,935 | B1 | 4/2003 | Sinha et al. |
| 6,190,494 | B1 | 2/2001 | Dow | 6,555,158 | B1 | 4/2003 | Yoshio et al. |
| 6,194,317 | B1 | 2/2001 | Kaisaki et al. | 6,561,889 | B1 | 5/2003 | Xu et al. |
| 6,206,756 | B1 | 3/2001 | Chopra et al. | 6,562,719 | B2 | 5/2003 | Kondo et al. |
| 6,210,257 | B1 | 4/2001 | Carlson | 6,565,619 | B1 | 5/2003 | Asano et al. |
| 6,217,416 | B1 | 4/2001 | Kaufman et al. | 6,569,004 | B1 | 5/2003 | Pham |
| 6,218,305 | B1 | 4/2001 | Hosali et al. | 6,572,463 | B1 | 6/2003 | Xu et al. |
| 6,234,870 | B1 | 5/2001 | Uzoh et al. | 6,579,153 | B2 | 6/2003 | Uchikura et al. |
| 6,238,271 | B1 | 5/2001 | Cesna | 6,582,281 | B2 | 6/2003 | Doan et al. |
| 6,238,592 | B1 | 5/2001 | Hardy et al. | 6,585,579 | B2 | 7/2003 | Jensen et al. |
| 6,244,935 | B1 | 6/2001 | Birang et al. | 6,593,239 | B2 | 7/2003 | Kaufman et al. |
| 6,248,222 | B1 | 6/2001 | Wang | 6,596,638 | B1 | 7/2003 | Kondo et al. |
| 6,251,235 | B1 | 6/2001 | Talieh et al. | 6,602,112 | B2 | 8/2003 | Tran et al. |
| 6,258,711 | B1 | 7/2001 | Laursen | 6,605,537 | B2 | 8/2003 | Bian et al. |
| 6,258,721 | B1 | 7/2001 | Li et al. | 6,612,904 | B1 | 9/2003 | Boehm et al. |
| 6,261,168 | B1 | 7/2001 | Jensen et al. | 6,616,976 | B2 | 9/2003 | Montano et al. |
| 6,261,959 | B1 | 7/2001 | Travis et al. | 6,620,215 | B2 | 9/2003 | Li et al. |
| 6,273,786 | B1 | 8/2001 | Chopra et al. | 6,630,059 | B1 | 10/2003 | Uzoh et al. |
| 6,273,798 | B1 | 8/2001 | Berman | 6,638,863 | B2 | 10/2003 | Wang et al. |
| 6,276,996 | B1 | 8/2001 | Chopra | 6,656,019 | B1 | 12/2003 | Chen et al. |
| 6,297,159 | B1 | 10/2001 | Paton | 6,666,959 | B2 | 12/2003 | Uzoh et al. |
| 6,303,049 | B1 | 10/2001 | Lee et al. | 6,676,484 | B2 | 1/2004 | Chopra |
| 6,303,551 | B1 | 10/2001 | Li et al. | 6,679,928 | B2 | 1/2004 | Costas et al. |
| 6,310,019 | B1 | 10/2001 | Kakizawa et al. | 6,679,929 | B2 | 1/2004 | Asano et al. |
| 6,315,803 | B1 | 11/2001 | Ina et al. | 6,685,548 | B2 | 2/2004 | Chen et al. |
| 6,315,883 | B1 | 11/2001 | Mayer et al. | 6,693,036 | B1 | 2/2004 | Nogami et al. |
| 6,319,108 | B1 | 11/2001 | Adefris et al. | 6,726,823 | B1 | 4/2004 | Wang et al. |
| 6,319,420 | B1 | 11/2001 | Dow | 6,736,952 | B2 | 5/2004 | Emesh et al. |
| 6,328,642 | B1 | 12/2001 | Pant et al. | 6,752,700 | B2 | 6/2004 | Duescher |
| 6,328,872 | B1 | 12/2001 | Talieh et al. | 6,769,969 | B1 | 8/2004 | Duescher |
| 6,331,135 | B1 | 12/2001 | Sabde et al. | 6,776,693 | B2 | 8/2004 | Duboust et al. |
| 6,348,076 | B1 | 2/2002 | Canaperi et al. | 6,848,977 | B1 | 2/2005 | Cook et al. |
| 6,354,916 | B1 | 3/2002 | Uzoh et al. | 7,153,410 | B2 * | 12/2006 | Moore et al. ................. 205/658 |
| 6,355,075 | B1 | 3/2002 | Ina et al. | 2001/0005667 | A1 | 6/2001 | Tolles et al. |
| 6,355,153 | B1 | 3/2002 | Uzoh et al. | 2001/0024878 | A1 | 9/2001 | Nakamura |
| 6,358,118 | B1 | 3/2002 | Boehm et al. | 2001/0027018 | A1 | 10/2001 | Molnar |
| 6,368,184 | B1 | 4/2002 | Beckage | 2001/0035354 | A1 | 11/2001 | Ashjaee et al. |
| 6,368,190 | B1 | 4/2002 | Easter et al. | 2001/0036746 | A1 | 11/2001 | Sato et al. |
| 6,375,693 | B1 | 4/2002 | Cote et al. | 2001/0040100 | A1 | 11/2001 | Wang |
| 6,379,223 | B1 | 4/2002 | Sun et al. | 2001/0042690 | A1 | 11/2001 | Talieh |
| 6,381,169 | B1 | 4/2002 | Bocian et al. | 2002/0008036 | A1 | 1/2002 | Wang |
| 6,383,066 | B1 | 5/2002 | Chen et al. | 2002/0011417 | A1 | 1/2002 | Talieh et al. |
| 6,386,956 | B1 | 5/2002 | Sato et al. | 2002/0016272 | A1 | 2/2002 | Kakizawa et al. |
| 6,391,166 | B1 | 5/2002 | Wang | 2002/0020621 | A1 | 2/2002 | Uzoh et al. |

| | | | | | |
|---|---|---|---|---|---|
| 2002/0025760 A1 | 2/2002 | Lee et al. | WO | WO 99/48081 | 9/1999 |
| 2002/0025763 A1 | 2/2002 | Lee | WO | WO 99/53119 | 10/1999 |
| 2002/0040100 A1 | 4/2002 | Kume et al. | WO | WO 99/53532 | 10/1999 |
| 2002/0070126 A1 | 6/2002 | Sato et al. | WO | WO 99/65072 | 12/1999 |
| 2002/0072309 A1 | 6/2002 | Sato et al. | WO | WO 00/03426 | 1/2000 |
| 2002/0074230 A1 | 6/2002 | Basol | WO | WO 00/24394 | 5/2000 |
| 2002/0077037 A1 | 6/2002 | Tietz | WO | WO 00/26443 | 5/2000 |
| 2002/0088709 A1 | 7/2002 | Hongo et al. | WO | WO 00/33356 | 6/2000 |
| 2002/0088715 A1 | 7/2002 | Talieh et al. | WO | WO 00/55876 | 9/2000 |
| 2002/0096659 A1 | 7/2002 | Sakai et al. | WO | WO 00/59682 | 10/2000 |
| 2002/0108861 A1 | 8/2002 | Emesh et al. | WO | WO 01/13416 | 2/2001 |
| 2002/0119288 A1 | 8/2002 | Chen et al. | WO | WO 01/49452 | 7/2001 |
| 2002/0123300 A1 | 9/2002 | Jones et al. | WO | WO 01/52307 | 7/2001 |
| 2002/0130049 A1 | 9/2002 | Chen et al. | WO | WO 01/63018 | 8/2001 |
| 2002/0130634 A1 | 9/2002 | Ziemkowski et al. | WO | WO 01/71066 | 9/2001 |
| 2002/0139055 A1 | 10/2002 | Asano et al. | WO | WO 01/077241 | 10/2001 |
| 2002/0146732 A1 | 10/2002 | Emesh et al. | WO | WO 01/77241 | 10/2001 |
| 2002/0146963 A1 | 10/2002 | Teetzet | WO | WO 01/88229 | 11/2001 |
| 2002/0160698 A1 | 10/2002 | Sato et al. | WO | WO 01/88954 | 11/2001 |
| 2003/0034131 A1 | 2/2003 | Park et al. | WO | WO 02/23616 | 3/2002 |
| 2003/0040188 A1 | 2/2003 | Hsu et al. | WO | WO 02/064314 | 8/2002 |
| 2003/0073386 A1 | 4/2003 | Ma et al. | WO | WO 02/075804 | 9/2002 |
| 2003/0079416 A1 | 5/2003 | Ma et al. | WO | WO 03/001581 | 1/2003 |
| 2003/0083214 A1 | 5/2003 | Kakizawa et al. | WO | WO 03/006205 | 1/2003 |
| 2003/0104782 A1 | 6/2003 | Sato et al. | WO | WO 03/060962 | 7/2003 |
| 2003/0113996 A1 | 6/2003 | Nogami et al. | WO | WO 03/060982 | 7/2003 |
| 2003/0114004 A1 | 6/2003 | Sato et al. | WO | WO 03/061905 A1 | 7/2003 |
| 2003/0114087 A1 | 6/2003 | Duboust et al. | | | |
| 2003/0116445 A1 | 6/2003 | Sun et al. | | | |
| 2003/0116446 A1 | 6/2003 | Duboust et al. | | | |
| 2003/0136055 A1 | 7/2003 | Li et al. | | | |
| 2003/0153184 A1 | 8/2003 | Wang et al. | | | |
| 2003/0170091 A1 | 9/2003 | Shomler et al. | | | |
| 2003/0170991 A1 | 9/2003 | Wang et al. | | | |
| 2003/0213703 A1 | 11/2003 | Wang et al. | | | |
| 2003/0220053 A1 | 11/2003 | Manens et al. | | | |
| 2003/0234184 A1 | 12/2003 | Liu et al. | | | |
| 2004/0023610 A1 | 2/2004 | Hu et al. | | | |
| 2005/0173259 A1* | 8/2005 | Mavliev et al. ............. 205/645 | | | |

FOREIGN PATENT DOCUMENTS

| | | |
|---|---|---|
| EP | 0 323 748 | 7/1989 |
| EP | 0 325 753 | 8/1989 |
| EP | 0 455 455 | 6/1991 |
| EP | 0 527 537 | 2/1993 |
| EP | 0 811 665 | 12/1997 |
| EP | 0 846 742 | 6/1998 |
| EP | 1 094 134 | 4/2001 |
| EP | 1 103 346 | 5/2001 |
| EP | 1 170 761 | 9/2002 |
| EP | 1 361 023 | 11/2003 |
| GB | 2 214 520 A | 9/1989 |
| JP | 6-1265279 | 11/1986 |
| JP | 05-277957 | 10/1993 |
| JP | 60 234998 | 1/1995 |
| JP | 10-006213 | 1/1998 |
| JP | 1016213 | 1/1998 |
| JP | 11-042554 | 2/1999 |
| JP | 2000-218513 | 8/2000 |
| JP | 2001-77117 | 3/2001 |
| JP | 2001-179611 | 7/2001 |
| JP | 2001-244223 | 9/2001 |
| KR | 2003-037158 | 5/2003 |
| SU | 1618538 | 1/1991 |
| WO | WO 93/15879 | 6/1993 |
| WO | WO 98/04646 | 2/1998 |
| WO | WO 98/49723 | 11/1998 |
| WO | WO 99/41434 | 8/1999 |

OTHER PUBLICATIONS

Robert J. Contolini, "Electrochemical Planarization of ULSI Copper" Jun. 1997, Solid State Technology, pp. 155-156, 158 and 160.

Nogami, "*An Innovation to Integrate Porous Low-K Materials and Copper*", InterConnect Japan 2001; Honeywell Seminar (Dec. 6, 2001) pp. 1-12.

Alexander, et al., "Electrically Conductive Polymer Nanocomposite Materials," www.afrihorizons.com/Briefs/Sept02/ML0206.html, date unknown.

International Search Report for PCT/US 02/11009 dated Feb. 6, 2003.

Partial International Search Report for US 02/40754 dated Apr. 28, 2003.

PCT International Search Report for US 02/04806 dated Apr. 1, 2003.

PCT International Search Report for PCT/US03/01760 dated May 27, 2003.

PCT International Search Report for US 03/06058 dated Jun. 25, 2003.

PCT International Search Report for PCT/US03/29230 dated Feb. 3, 2004.

PCT Written Opinion for PCT/US03/06058, dated Feb. 13, 2004.

PCT Written Opinion for PCT/US03/01760 dated Mar. 8, 2004.

PCT Written Opinion for PCT/US02/04806, dated Mar. 9, 2004.

PCT International Preliminary Examination Report for PCT/US02/04806, dated Sep. 7, 2004.

PCT International Preliminary Examination Report for PCT/US03/06058, dated Sep. 7, 2004.

PCT International Search Report dated Mar. 30, 2005 for PCT/US2004/007501.

PCT Written Opinion dated Mar. 30, 2005 for PCT/US2004/007501.

PCT Invitation to Pay Additional Fees for PCT/US04/006385 dated Mar. 22, 2005.

PCT International Search Report for PCT/US04/006385 dated May 17, 2005.

PCT Written Opinion for PCT/US04/006385 dated May 17, 2005.

PCT International Search Report dated Jul. 29, 2005 for PCT/US04/043516.

PCT Written Opinion dated Jul. 29, 2005 for PCT/US04/043516.

* cited by examiner

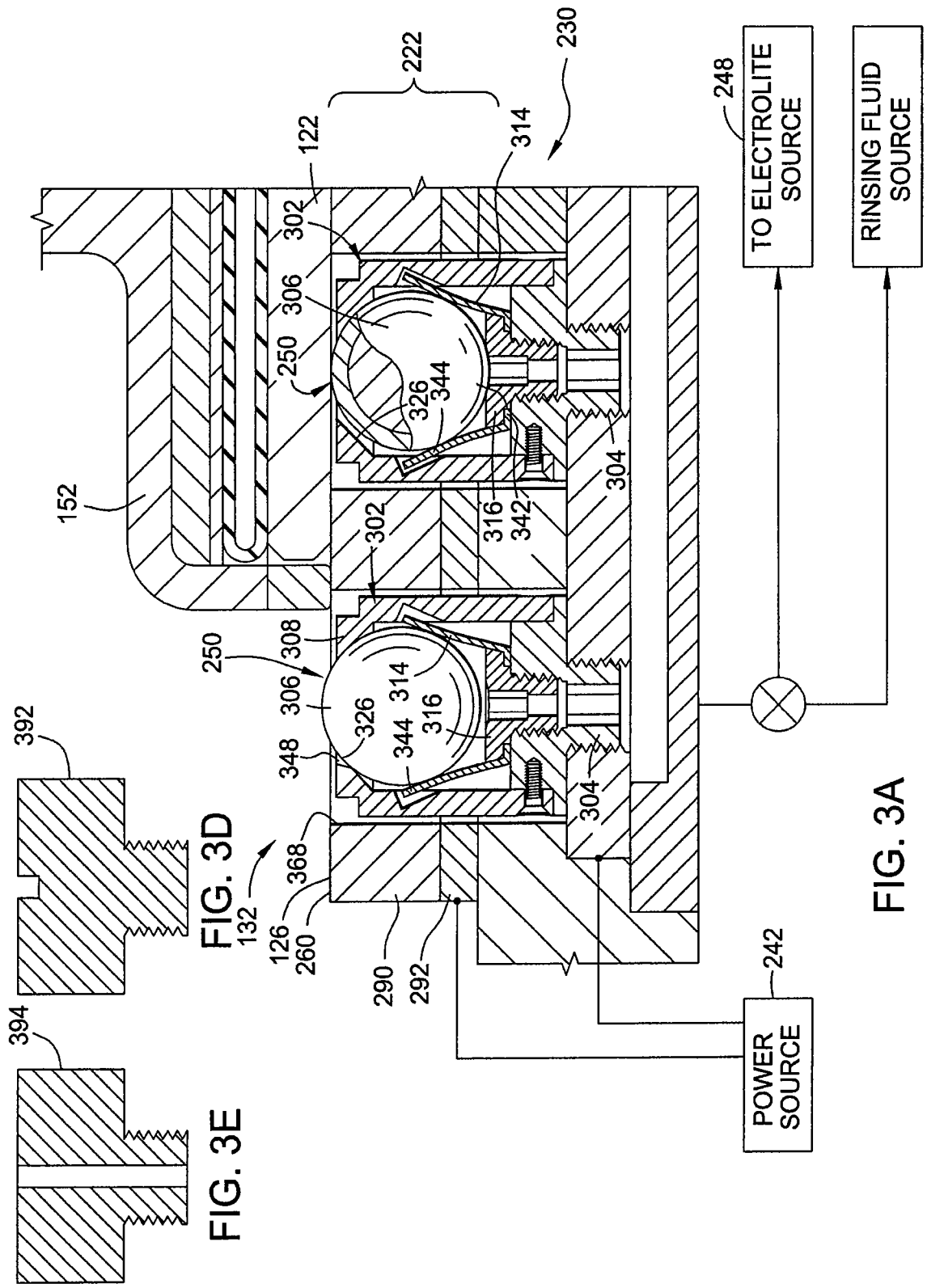

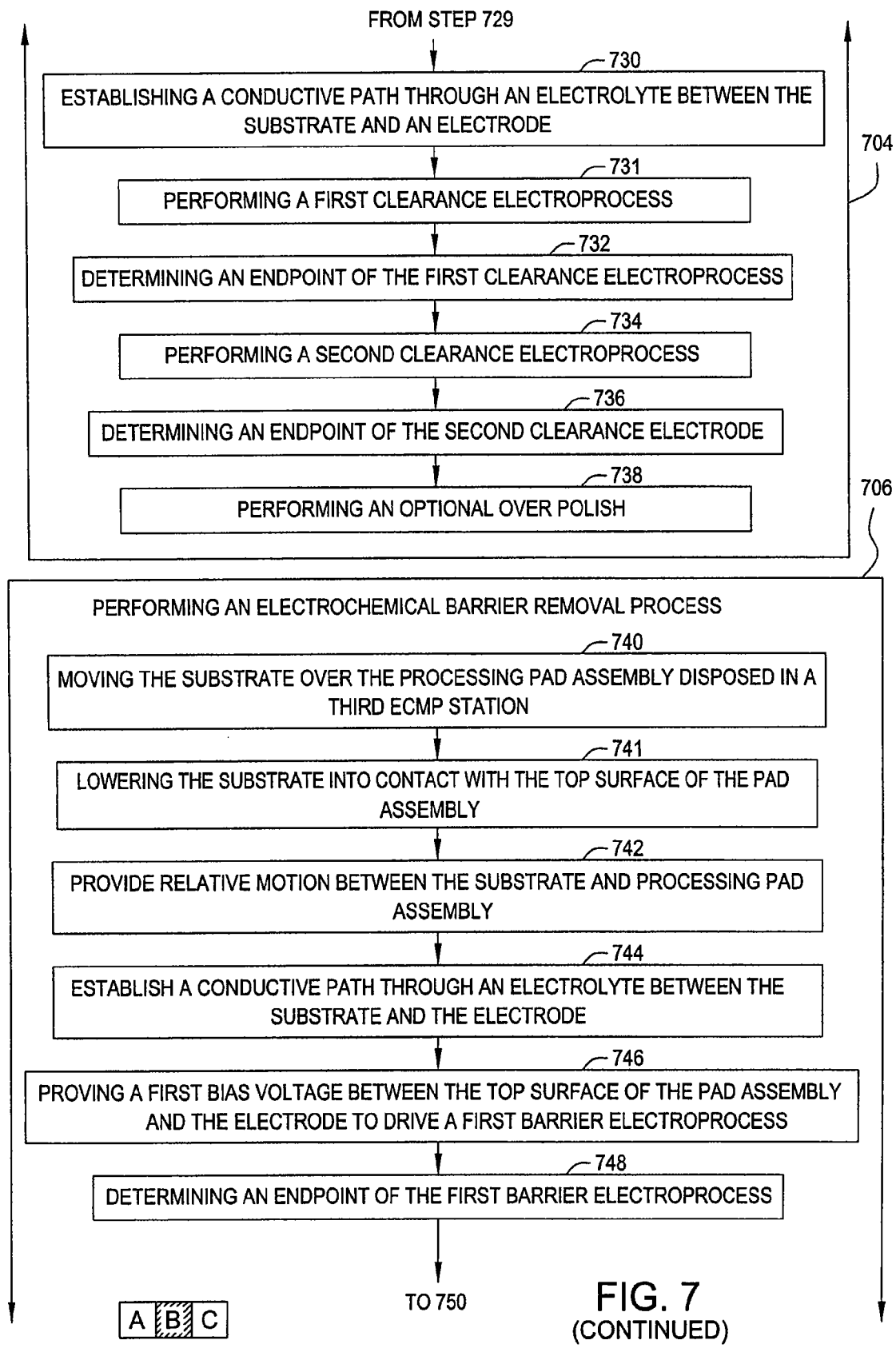

FULL SEQUENCE METAL AND BARRIER LAYER ELECTROCHEMICAL MECHANICAL PROCESSING

CROSS-REFERENCE TO RELATED APPLICATIONS

This application is a continuation of U.S. patent application Ser. No. 10/941,060, filed Sep. 14, 2004 now U.S. Pat. No. 7,084,064, which is incorporated by reference in its entirety.

BACKGROUND OF THE INVENTION

1. Field of the Invention

Embodiments of the present invention generally relate to a method for electrochemical processing.

2. Description of the Related Art

Electrochemical mechanical planarizing (ECMP) is a technique used to remove conductive materials from a substrate surface by electrochemical dissolution while concurrently polishing the substrate with reduced mechanical abrasion compared to conventional planarization processes. ECMP systems may generally be adapted for deposition of conductive material on the substrate by reversing the polarity of the bias. Electrochemical dissolution is performed by applying a bias between a cathode and a substrate surface to remove conductive materials from the substrate surface into a surrounding electrolyte. Typically, the bias is applied to the substrate surface by a conductive polishing material on which the substrate is processed. A mechanical component of the polishing process is performed by providing relative motion between the substrate and the conductive polishing material that enhances the removal of the conductive material from the substrate.

In many conventional systems, ECMP of the conductive film is followed by a conventional chemical mechanical processing for barrier removal. This dichotomy of processing (e.g., ECMP and CMP on a single system) requires divergent utilities and process consumables, resulting in higher cost of ownership. Moreover, as most ECMP processes utilize lower contact pressure between the substrate being processed and a processing surface, the heads utilized to retain the substrate during processing do not provide robust processing performance when utilized for convention CMP processes, which typically have high contact pressures, which results in high erosion of conductive material disposed in trenches or other features. As the removal rate of low pressure conventional CMP barrier layer processing is generally less than about 100 Å/min, conventional CMP processing of barrier materials using low pressure is not suitable for large scale commercialization. Thus, it would be advantageous for a system to be enabled to remove barrier materials, such as ruthenium, tantalum, tantalum nitride, titanium, titanium nitride and the like, through an electrochemical process.

Thus, there is a need for an improved method and apparatus for electrochemical processing of metal and barrier materials.

SUMMARY OF THE INVENTION

Embodiments of the invention generally provide a method for processing barrier and metals disposed on a substrate in an electrochemical mechanical planarizing system. A method and apparatus for electrochemically processing metal and barrier materials is provided. In one embodiment, a method for electrochemically processing a substrate includes the steps of establishing an electrically-conductive path through an electrolyte between an exposed layer of barrier material on the substrate and an electrode, pressing the substrate against a processing pad assembly, providing motion between the substrate and pad assembly in contact therewith and electrochemically removing a portion of the exposed layer during a first electrochemical processing step in a barrier processing station.

In another embodiment, a method for electrochemically processing a substrate includes removing a conductively layer having a barrier layer disposed thereunder at a first processing station of a system and electrochemically removing the barrier layer at a second processing station of the system using a low substrate to processing pad contact pressure. The system may include a processing station disposed between the first and second processing stations for residual removal of the conductive layer using a multi-step removal process.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 3A is a partial sectional view of the bulk ECMP station through two contact assemblies;

FIG. 3D-E are sectional views of plugs;

To facilitate understanding, identical reference numerals have been used, where possible, to designate identical elements that are common to the figures.

DETAILED DESCRIPTION

Embodiments for a system and method for removal of conductive and barrier materials from a substrate are provided. Although the embodiments disclosed below focus primarily on removing material from, e.g., planarizing, a substrate, it is contemplated that the teachings disclosed herein may be used to electroplate a substrate by reversing the polarity of an electrical bias applied between the substrate and an electrode of the system.

Apparatus

Figure 1:
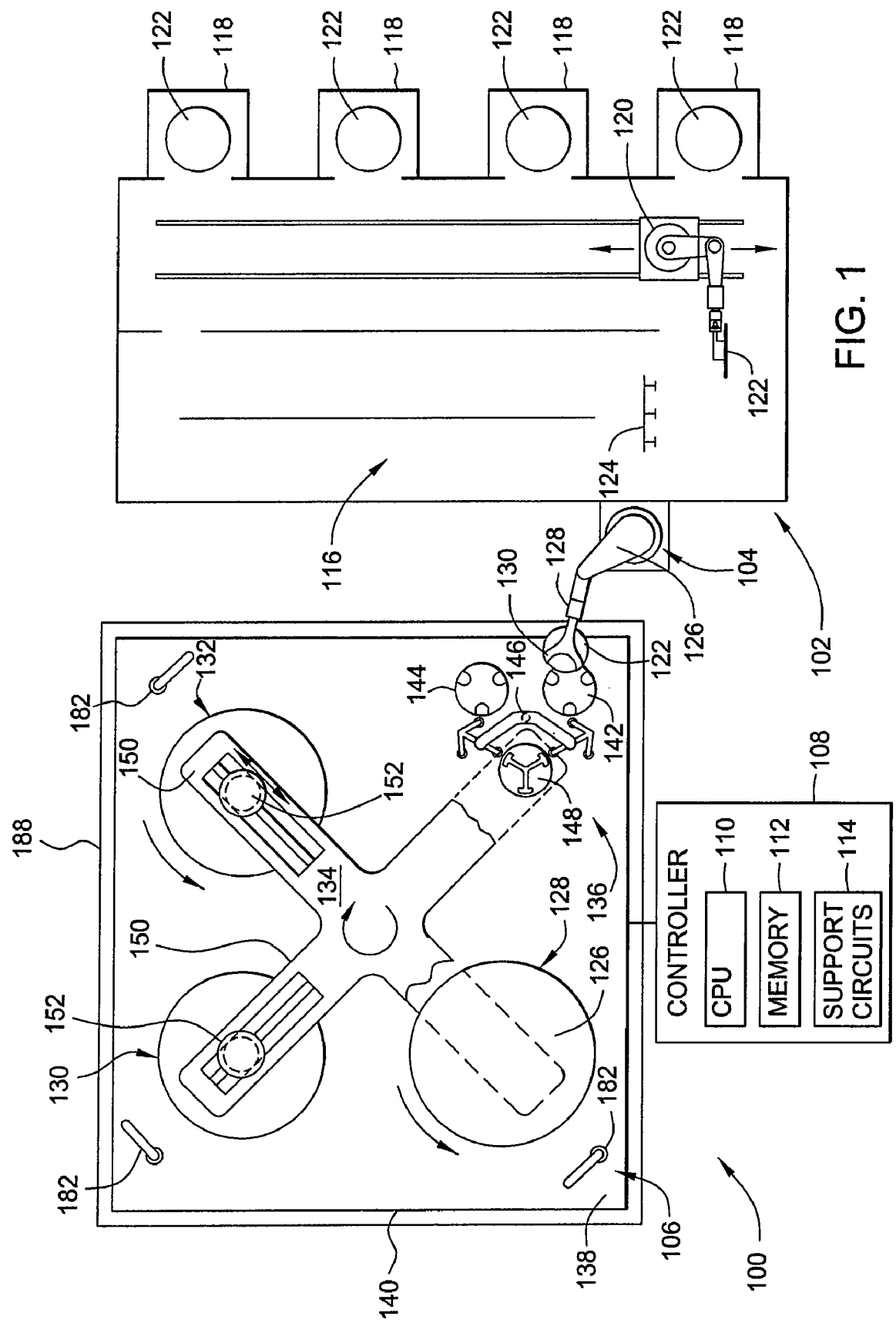
FIG. 1 is a plan view of an electrochemical mechanical planarizing system.

FIG. 1 is a plan view of one embodiment of a planarization system 100 having an apparatus for electrochemically processing a substrate. The exemplary system 100 generally comprises a factory interface 102, a loading robot 104, and a planarizing module 106. The loading robot 104 is disposed proximate the factory interface 102 and the planarizing module 106 to facilitate the transfer of substrates 122 therebetween.

A controller 108 is provided to facilitate control and integration of the modules of the system 100. The controller 108 comprises a central processing unit (CPU) 110, a memory 112, and support circuits 114. The controller 108 is coupled to the various components of the system 100 to facilitate control of, for example, the planarizing, cleaning, and transfer processes.

The factory interface 102 generally includes a cleaning module 116 and one or more wafer cassettes 118. An interface robot 120 is employed to transfer substrates 122 between the wafer cassettes 118, the cleaning module 116 and an input module 124. The input module 124 is positioned to facilitate transfer of substrates 122 between the planarizing module 106 and the factory interface 102 by grippers, for example vacuum grippers or mechanical clamps.

The planarizing module 106 includes at least a first electrochemical mechanical planarizing (ECMP) station 128, disposed in an environmentally controlled enclosure 188. Examples of planarizing modules 106 that can be adapted to benefit from the invention include MIRRA®, MIRRA MESA™, REFLEXION®, REFLEXION® LK, and REFLEXION LK Ecmp™ Chemical Mechanical Planarizing Systems, all available from Applied Materials, Inc. of Santa Clara, Calif. Other planarizing modules, including those that use processing pads, planarizing webs, or a combination thereof, and those that move a substrate relative to a planarizing surface in a rotational, linear or other planar motion may also be adapted to benefit from the invention.

In the embodiment depicted in FIG. 1, the planarizing module 106 includes the first ECMP station 128, a second ECMP station 130 and a third ECMP station 132. Bulk removal of conductive material disposed on the substrate 122 may be performed through an electrochemical dissolution process at the first ECMP station 128. After the bulk material removal at the first ECMP station 128, the remaining conductive material is removed from the substrate at the second ECMP station 130 through a multi-step electrochemical mechanical process, wherein part of the multi-step process is configured to remove residual conductive material. It is contemplated that more than one ECMP station may be utilized to perform the multi-step removal process after the bulk removal process performed at a different station. Alternatively, each of the first and second ECMP stations 128, 130 may be utilized to perform both the bulk and multi-step conductive material removal on a single station. It is also contemplated that all ECMP stations (for example 3 stations of the module 106 depicted in FIG. 1) may be configured to process the conductive layer with a two step removal process.

The exemplary planarizing module 106 also includes a transfer station 136 and a carousel 134 that are disposed on an upper or first side 138 of a machine base 140. In one embodiment, the transfer station 136 includes an input buffer station 142, an output buffer station 144, a transfer robot 146, and a load cup assembly 148. The input buffer station 142 receives substrates from the factory interface 102 by means of the loading robot 104. The loading robot 104 is also utilized to return polished substrates from the output buffer station 144 to the factory interface 102. The transfer robot 146 is utilized to move substrates between the buffer stations 142, 144 and the load cup assembly 148.

In one embodiment, the transfer robot 146 includes two gripper assemblies, each having pneumatic gripper fingers that hold the substrate by the substrate's edge. The transfer robot 146 may simultaneously transfer a substrate to be processed from the input buffer station 142 to the load cup assembly 148 while transferring a processed substrate from the load cup assembly 148 to the output buffer station 144. An example of a transfer station that may be used to advantage is described in U.S. Pat. No. 6,156,124, issued Dec. 5, 2000 to Tobin, which is herein incorporated by reference in its entirety.

The carousel 134 is centrally disposed on the base 140. The carousel 134 typically includes a plurality of arms 150, each supporting a planarizing head assembly 152. Two of the arms 150 depicted in FIG. 1 are shown in phantom such that the transfer station 136 and a planarizing surface 126 of the first ECMP station 128 may be seen. The carousel 134 is indexable such that the planarizing head assemblies 152 may be moved between the planarizing stations 128, 130, 132 and the transfer station 136. One carousel that may be utilized to advantage is described in U.S. Pat. No. 5,804,507, issued Sep. 8, 1998 to Perlov, et al., which is hereby incorporated by reference in its entirety.

A conditioning device 182 is disposed on the base 140 adjacent each of the planarizing stations 128, 130, 132. The conditioning device 182 periodically conditions the planarizing material disposed in the stations 128, 130, 132 to maintain uniform planarizing results.

Figure 2:
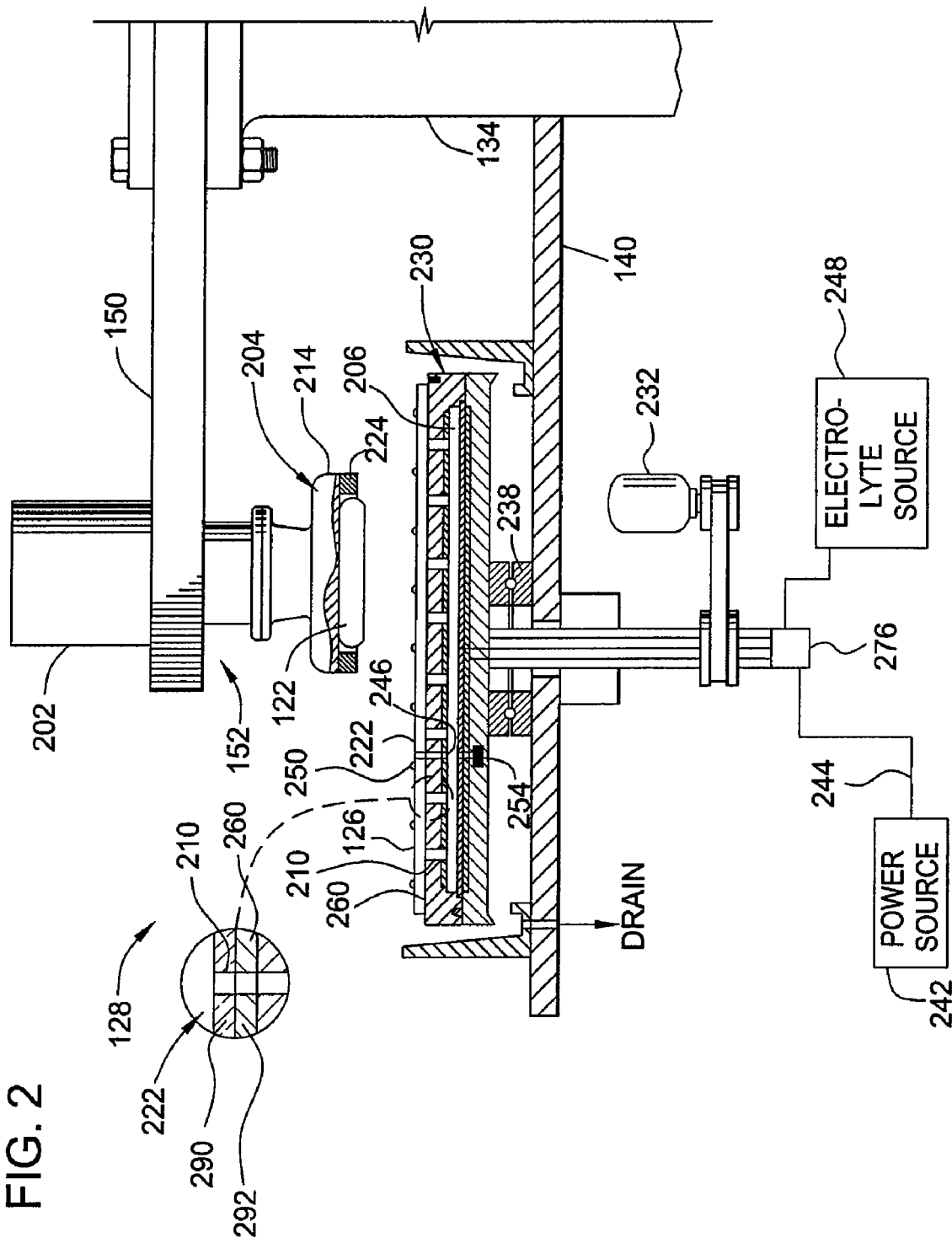
FIG. 2 is a sectional view of one embodiment of a first electrochemical mechanical planarizing (ECMP) station of the system of FIG. 1.

FIG. 2 depicts a sectional view of one of the planarizing head assemblies 152 positioned over one embodiment of the first ECMP station 128. The second and third ECMP stations 130, 132 may be similarly configured. The planarizing head assembly 152 generally comprises a drive system 202 coupled to a planarizing head 204. The drive system 202 generally provides at least rotational motion to the planarizing head 204. The planarizing head 204 additionally may be actuated toward the first ECMP station 128 such that the substrate 122 retained in the planarizing head 204 may be disposed against the planarizing surface 126 of the first ECMP station 128 during processing. The drive system 202 is coupled to the controller 108 that provides a signal to the drive system 202 for controlling the rotational speed and direction of the planarizing head 204.

In one embodiment, the planarizing head may be a TITAN HEAD™ or TITAN PROFILER™ wafer carrier manufactured by Applied Materials, Inc. Generally, the planarizing head 204 comprises a housing 214 and retaining ring 224 that defines a center recess in which the substrate 122 is retained. The retaining ring 224 circumscribes the substrate 122 disposed within the planarizing head 204 to prevent the substrate from slipping out from under the planarizing head 204 while processing. The retaining ring 224 can be made of plastic materials such as PPS, PEEK, and the like, or conductive materials such as stainless steel, Cu, Au, Pd, and the like, or some combination thereof. It is further contemplated that a conductive retaining ring 224 may be electrically biased to control the electric field during ECMP. Conductive or biased retaining rings tend to slow the polishing rate proximate the edge of the substrate. It is contemplated that other planarizing heads may be utilized.

The first ECMP station 128 generally includes a platen assembly 230 that is rotationally disposed on the base 140. The platen assembly 230 is supported above the base 140 by a bearing 238 so that the platen assembly 230 may be rotated relative to the base 140. An area of the base 140 circumscribed by the bearing 238 is open and provides a conduit for the electrical, mechanical, pneumatic, control signals and connections communicating with the platen assembly 230.

Conventional bearings, rotary unions and slip rings, collectively referred to as rotary coupler 276, are provided such that electrical, mechanical, fluid, pneumatic, control signals and connections may be coupled between the base 140 and the rotating platen assembly 230. The platen assembly 230 is typically coupled to a motor 232 that provides the rotational motion to the platen assembly 230. The motor 232 is coupled to the controller 108 that provides a signal for controlling for the rotational speed and direction of the platen assembly 230.

A top surface 260 of the platen assembly 230 supports a processing pad assembly 222 thereon. The processing pad assembly may be retained to the platen assembly 230 by magnetic attraction, vacuum, clamps, adhesives and the like.

A plenum 206 is defined in the platen assembly 230 to facilitate uniform distribution of electrolyte to the planarizing surface 126. A plurality of passages, described in greater detail below, are formed in the platen assembly 230 to allow electrolyte, provided to the plenum 206 from an electrolyte source 248, to flow uniformly though the platen assembly 230 and into contact with the substrate 122 during processing. It is contemplated that different electrolyte compositions may be provided during different stages of processing or at different ECMP stations 128, 130, 132.

The processing pad assembly 222 includes an electrode 292 and at least a planarizing portion 290. The electrode 292 is typically comprised of a conductive material, such as stainless steel, copper, aluminum, gold, silver and tungsten, among others. The electrode 292 may be solid, impermeable to electrolyte, permeable to electrolyte or perforated. At least one contact assembly 250 extends above the processing pad assembly 222 and is adapted to electrically couple the substrate being processing on the processing pad assembly 222 to the power source 242. The electrode 292 is also coupled to the power source 242 so that an electrical potential may be established between the substrate and electrode 292.

A meter 244 is provided to detect a metric indicative of the electrochemical process. The meter 244 may be coupled or positioned between the power source 242 and at least one of the electrode 292 or contact assembly 250. The meter 244 may also be integral to the power source 242. In one embodiment, the meter 244 is configured to provide the controller 108 with a metric indicative of processing, such as a charge, current and/or voltage. This metric may be utilized by the controller 108 to adjust the processing parameters in-situ or to facilitate endpoint or other process stage detection.

A window 246 is provided through the pad assembly 222 and/or platen assembly 230, and is configured to allow a sensor 254, positioned below the pad assembly 222, to sense a metric indicative of polishing performance. For example, the sensor 254 may be an eddy current sensor or an interferometer, among other sensors. The metric, provided by the sensor 254 to the controller 108, provides information that may be utilized for processing profile adjustment in-situ, endpoint detection or detection of another point in the electrochemical process. In one embodiment, the sensor 254 an interferometer capable of generating a collimated light beam, which during processing, is directed at and impinges on a side of the substrate 122 that is being polished. The interference between reflected signals is indicative of the thickness of the conductive layer of material being processed. One sensor that may be utilized to advantage is described in U.S. Pat. No. 5,893,796, issued Apr. 13, 1999, to Birang, et al., which is hereby incorporated by reference in its entirety.

Embodiments of the processing pad assembly 222 suitable for removal of conductive material from the substrate 122 may generally include a planarizing surface 126 that is substantially dielectric. Other embodiments of the processing pad assembly 222 suitable for removal of conductive material from the substrate 122 may generally include a planarizing surface 126 that is substantially conductive. At least one contact assembly 250 is provided to couple the substrate to the power source 242 so that the substrate may be biased relative to the electrode 292 during processing. Apertures 210, formed through the planarizing layer 290, allow the electrolyte to establish a conductive path between the substrate 122 and electrode 292.

In one embodiment, the planarizing portion 290 of the processing pad assembly 222 is a dielectric, such as polyurethane. Examples of processing pad assemblies that may be adapted to benefit from the invention are described in U.S. patent application Ser. No. 10/455,941, filed Jun. 6, 2003 by Y. Hu et al. (entitled "CONDUCTIVE PLANARIZING ARTICLE FOR ELECTROCHEMICAL MECHANICAL PLANARIZING") and U.S. patent application Ser. No. 10/455,895, filed Jun. 6, 2003 by Y. Hu et al. (entitled "CONDUCTIVE PLANARIZING ARTICLE FOR ELECTROCHEMICAL MECHANICAL PLANARIZING"), both of which are hereby incorporated by reference in their entireties.

Figure 3B:
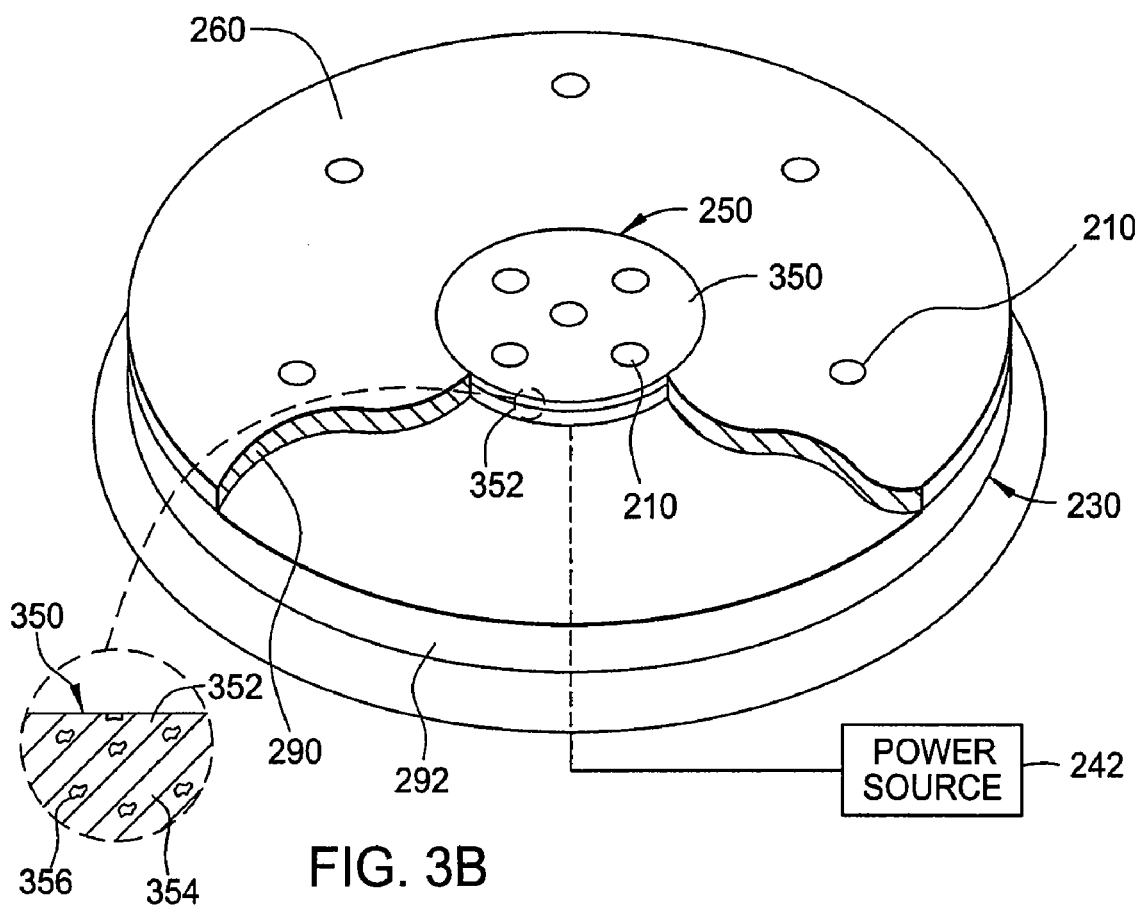
FIGS. 3B-C are sectional views of alternative embodiments of contact assemblies.
Figure 4A:
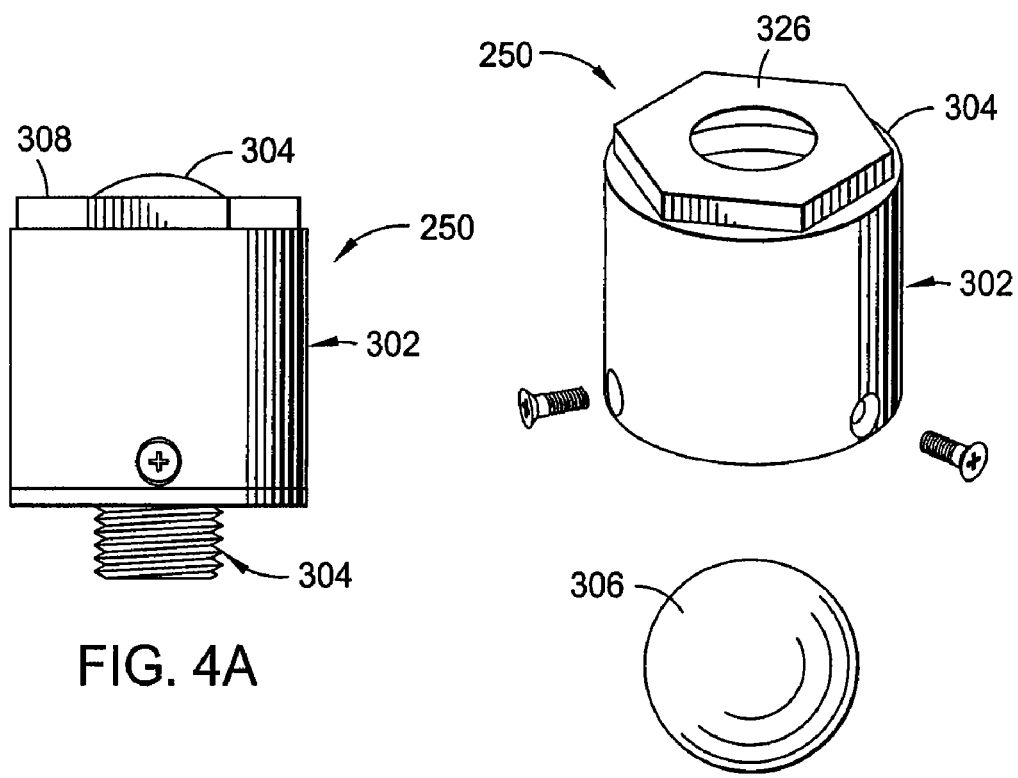
FIG. 4 are side, exploded and sectional views of one embodiment of a contact assembly.
Figure 4B:
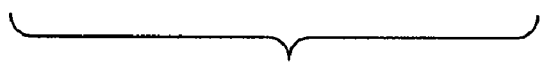

FIG. 3A is a partial sectional view of the first ECMP station 128 through two contact assemblies 250, and FIGS. 4A-C are side, exploded and sectional views of one of the contact assemblies 250 shown in FIG. 3A. The platen assembly 230 includes at least one contact assembly 250 projecting therefrom and coupled to the power source 242 that is adapted to bias a surface of the substrate 122 during processing. The contact assemblies 250 may be coupled to the platen assembly 230, part of the processing pad assembly 222, or a separate element. Although two contact assemblies 250 are shown in FIG. 3A, any number of contact assemblies may be utilized and may be distributed in any number of configurations relative to the centerline of the platen assembly 230.

The contact assemblies 250 are generally electrically coupled to the power source 242 through the platen assembly 230 and are movable to extend at least partially through respective apertures 368 formed in the processing pad assembly 222. The positions of the contact assemblies 250 may be chosen to have a predetermined configuration across the platen assembly 230. For predefined processes, individual contact assemblies 250 may be repositioned in different apertures 368, while apertures not containing contact assemblies may be plugged with a stopper 392 or filled with a nozzle 394 (as shown in FIGS. 3D-E) that allows flow of electrolyte from the plenum 206 to the substrate. One contact assembly that may be adapted to benefit from the invention is described in U.S. patent application Ser. No. 10/445,239, filed May 23, 2003, by Butterfield, et al., and is hereby incorporated by reference in its entirety.

Although the embodiments of the contact assembly 250 described below with respect to FIG. 3A depicts a rolling ball contact, the contact assembly 250 may alternatively comprise a structure or assembly having a conductive upper layer or surface suitable for electrically biasing the substrate 122 during processing. For example, as depicted in FIG. 3B, the contact assembly 250 may include a pad structure 350 having an upper layer 352 made from a conductive material or a conductive composite (i.e., the conductive elements are dispersed integrally with or comprise the material comprising the upper surface), such as a polymer matrix 354 having conductive particles 356 dispersed therein or a conductive coated fabric, among others. The pad structure 350 may include one or more of the apertures 210 formed therethrough for electrolyte delivery to the upper surface of the pad assembly. Other examples of suitable contact assemblies are described in U.S. Provisional Patent Application Ser. No. 60/516,680, filed Nov. 3, 2003, by Hu, et al., which is hereby incorporated by reference in its entirety.

Figure 3C:
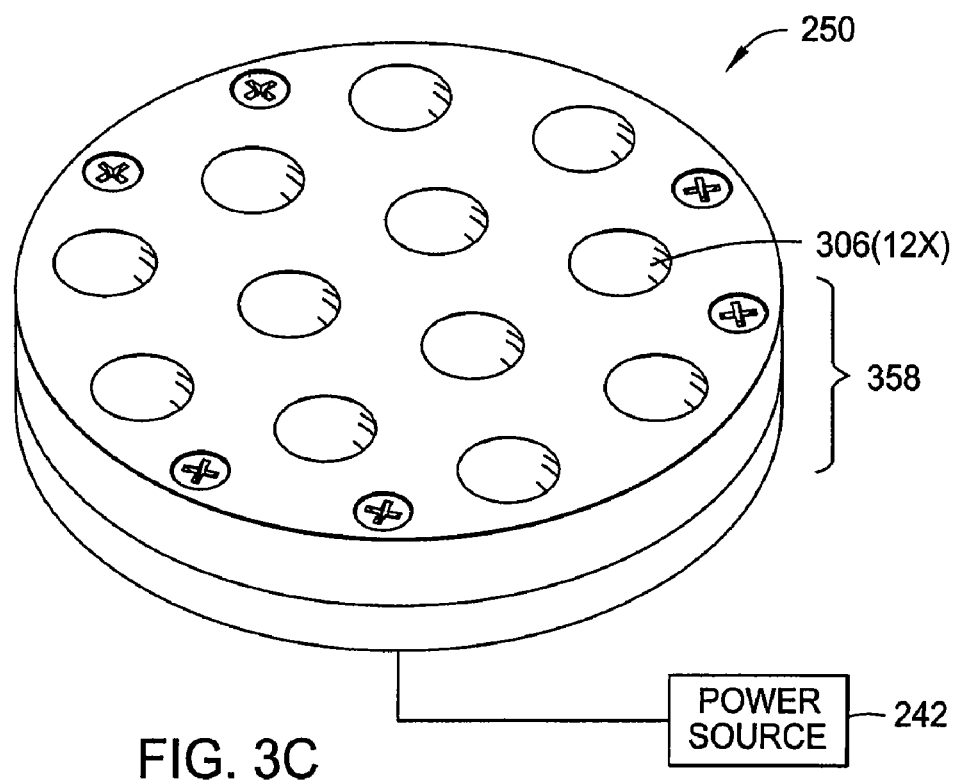

In one embodiment, each of the contact assemblies 250 includes a hollow housing 302, an adapter 304, a ball 306, a contact element 314 and a clamp bushing 316. The ball 306 has a conductive outer surface and is movably disposed in the housing 302. The ball 306 may be disposed in a first position having at least a portion of the ball 306 extending above the planarizing surface 126 and at least a second position where the ball 306 is substantially flush with the planarizing surface 126. It is also contemplated that the ball 306 may move completely below the planarizing surface 126. The ball 306 is generally suitable for electrically coupling the substrate 122 to the power source 242. It is contemplated that a plurality of balls 306 for biasing the substrate may be disposed in a single housing 358 as depicted in FIG. 3C.

The power source 242 generally provides a positive electrical bias to the ball 306 during processing. Between planarizing substrates, the power source 242 may optionally apply a negative bias to the ball 306 to minimize attack on the ball 306 by process chemistries.

The housing 302 is configured to provide a conduit for the flow of electrolyte from the source 248 to the substrate 122 during processing. The housing 302 is fabricated from a dielectric material compatible with process chemistries. A seat 326 formed in the housing 302 prevents the ball 306 from passing out of the first end 308 of the housing 302. The seat 326 optionally may include one or more grooves 348 formed therein that allow fluid flow to exit the housing 302 between the ball 306 and seat 326. Maintaining fluid flow past the ball 306 may minimize the propensity of process chemistries to attack the ball 306.

The contact element 314 is coupled between the clamp bushing 316 and the adapter 304. The contact element 314 is generally configured to electrically connect the adapter 304 and ball 306 substantially or completely through the range of ball positions within the housing 302. In one embodiment, the contact element 314 may be configured as a spring form.

Figure 5:
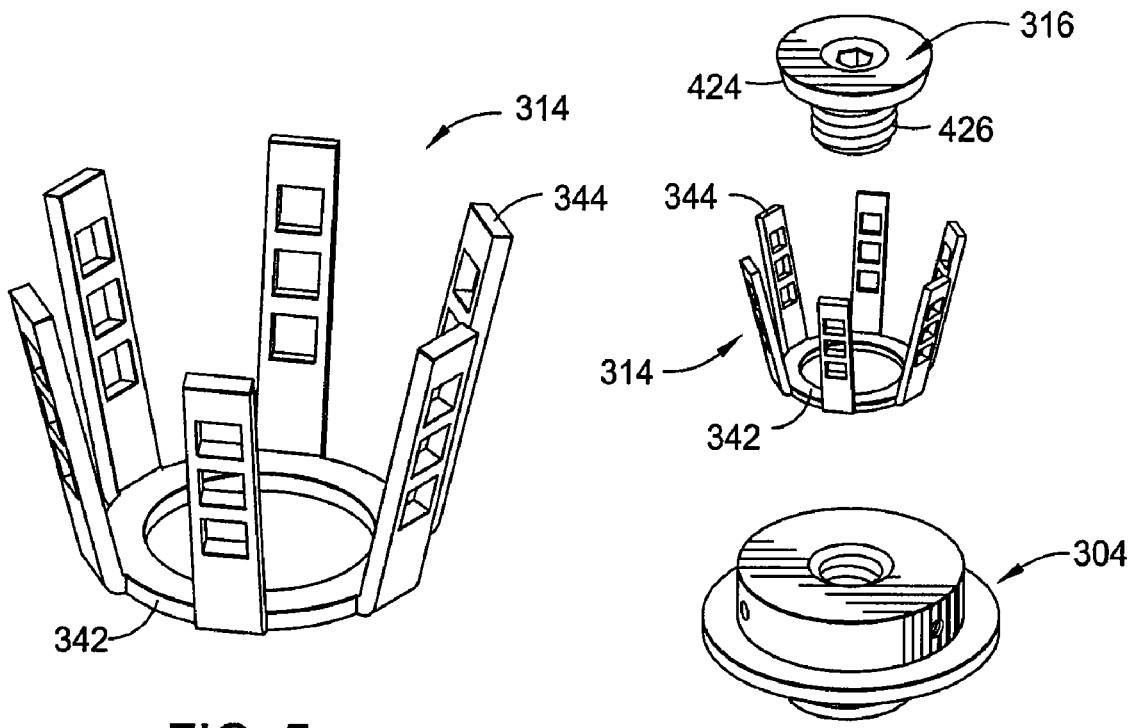
FIG. 5 is one embodiment of a contact element.

In the embodiment depicted in FIGS. 3 and 4A-C and detailed in FIG. 5, the contact element 314 includes an annular base 342 having a plurality of flexures 344 extending therefrom in a polar array. The flexure 344 is generally fabricated from a resilient and conductive material suitable for use with process chemistries. In one embodiment, the flexure 344 is fabricated from gold plated beryllium copper.

Returning to FIGS. 3A and 4A-B, the clamp bushing 316 includes a flared head 424 having a threaded post 422 extending therefrom. The clamp bushing 316 may be fabricated from either a dielectric or conductive material, or a combination thereof, and in one embodiment, is fabricated from the same material as the housing 302. The flared head 424 maintains the flexures 344 at an acute angle relative to the centerline of the contact assembly 250 so that the flexures 344 of the contact elements 314 are positioned to spread around the surface of the ball 306 to prevent bending, binding and/or damage to the flexures 344 during assembly of the contact assembly 250 and through the range of motion of the ball 306.

The ball 306 may be solid or hollow and is typically fabricated from a conductive material. For example, the ball 306 may be fabricated from a metal, conductive polymer or a polymeric material filled with conductive material, such as metals, conductive carbon or graphite, among other conductive materials. Alternatively, the ball 306 may be formed from a solid or hollow core that is coated with a conductive material. The core may be non-conductive and at least partially coated with a conductive covering.

The ball 306 is generally actuated toward the planarizing surface 126 by at least one of spring, buoyant or flow forces. In the embodiment depicted in FIG. 3, flow through the passages formed through the adapter 304 and clamp bushing 316 and the platen assembly 230 from the electrolyte source 248 urge the ball 306 into contact with the substrate during processing.

Figure 6:
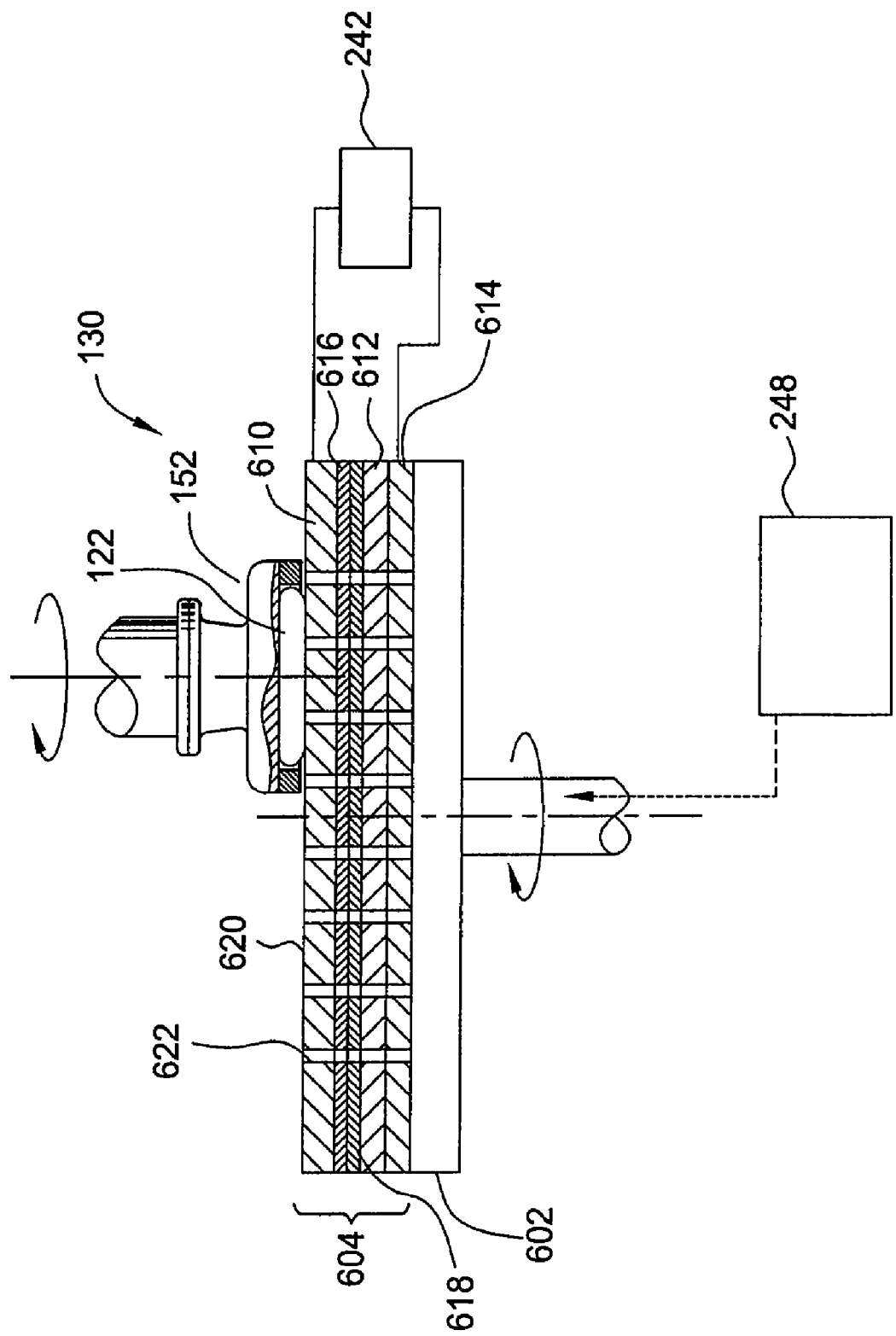
FIG. 6 is a perspective view of another embodiment of another ECMP station.

FIG. 6 is a sectional view of one embodiment of the second ECMP station 130. The first and third ECMP stations 128, 132 may be configured similarly. The second ECMP station 130 generally includes a platen 602 that supports a fully conductive processing pad assembly 604. The platen 602 may be configured similar to the platen assembly 230 described above to deliver electrolyte through the processing pad assembly 604, or the platen 602 may have a fluid delivery arm 606 disposed adjacent thereto configured to supply electrolyte to a planarizing surface of the processing pad assembly 604. The platen assembly 602 includes at least one of a meter 244 or sensor 254 (shown in FIG. 2) to facilitate endpoint detection.

In one embodiment, the processing pad assembly 604 includes interposed pad 612 sandwiched between a conductive pad 610 and an electrode 614. The conductive pad 610 is substantially conductive across its top processing surface and is generally made from a conductive material or a conductive composite (i.e., the conductive elements are dispersed integrally with or comprise the material comprising the planarizing surface), such as a polymer matrix having conductive particles dispersed therein or a conductive coated fabric, among others. The conductive pad 610, the interposed pad 612, and the electrode 614 may be fabricated into a single, replaceable assembly. The processing pad assembly 604 is generally permeable or perforated to allow electrolyte to pass between the electrode 614 and top surface 620 of the conductive pad 610. In the embodiment depicted in FIG. 6, the processing pad assembly 604 is perforated by apertures 622 to allow electrolyte to flow therethrough. In one embodiment, the conductive pad 610 is comprised of a conductive material disposed on a polymer matrix disposed on a conductive fiber, for example, tin particles in a polymer matrix disposed on a woven copper coated polymer. The conductive pad 610 may also be utilized for the contact assembly 250 in the embodiment of FIG. 3C.

A conductive foil 616 may additionally be disposed between the conductive pad 610 and the subpad 612. The foil 616 is coupled to a power source 242 and provides uniform distribution of voltage applied by the source 242 across the conductive pad 610. In embodiments not including the conductive foil 616, the conductive pad 610 may be coupled directly, for example, via a terminal integral to the pad 610, to the power source 242. Additionally, the pad assembly 604 may include an interposed pad 618, which, along with the foil 616, provides mechanical strength to the overlying conductive pad 610. Examples of suitable pad assemblies are described in the previously incorporated U.S. patent application Ser. Nos. 10/455,941 and 10/455,895.

Method for Electroprocessing Metal and Barrier Layers

Figure 7:
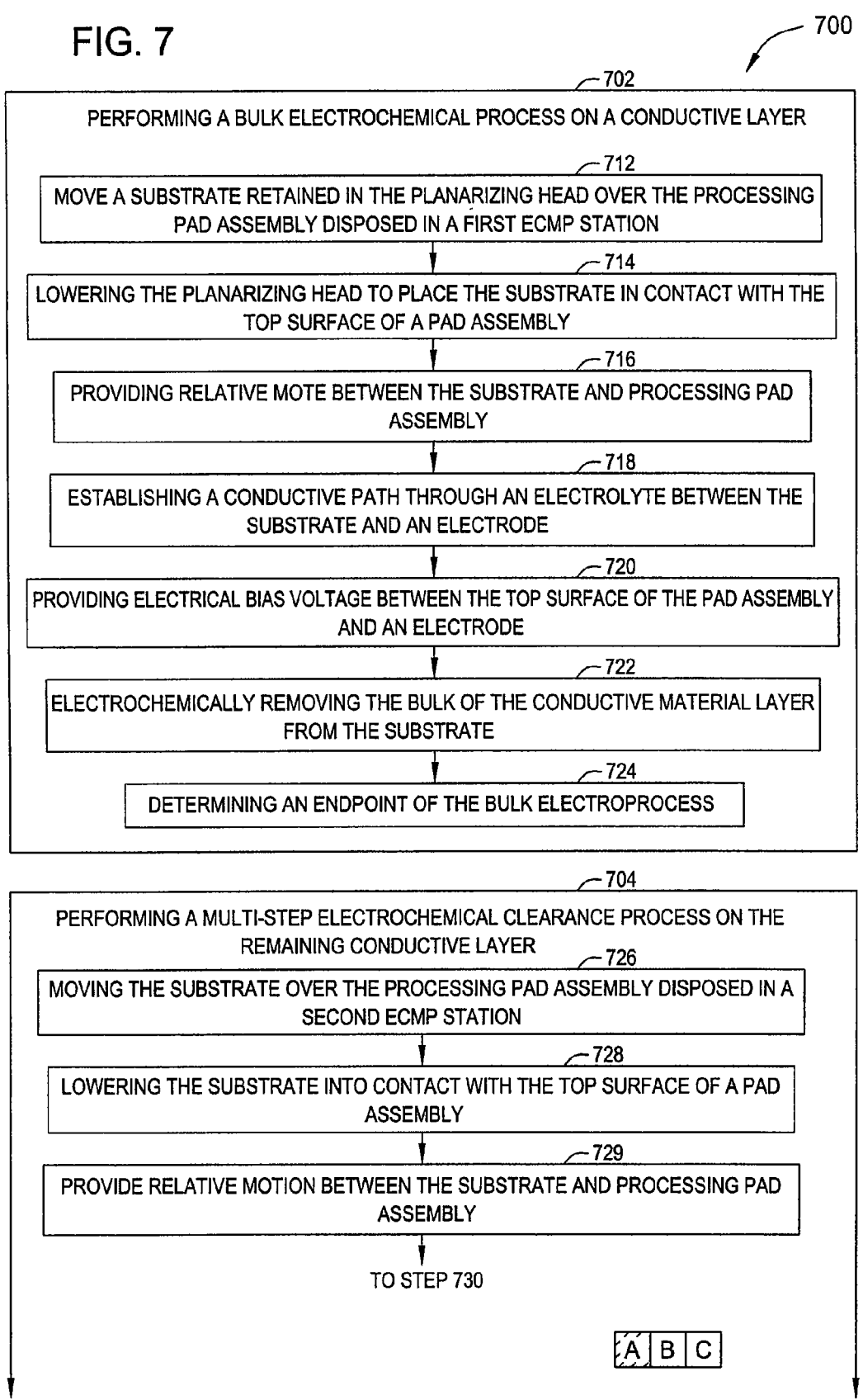
FIG. 7 is a flow diagram of one embodiment of a method for electroprocessing conductive and barrier materials.
Figure 7:
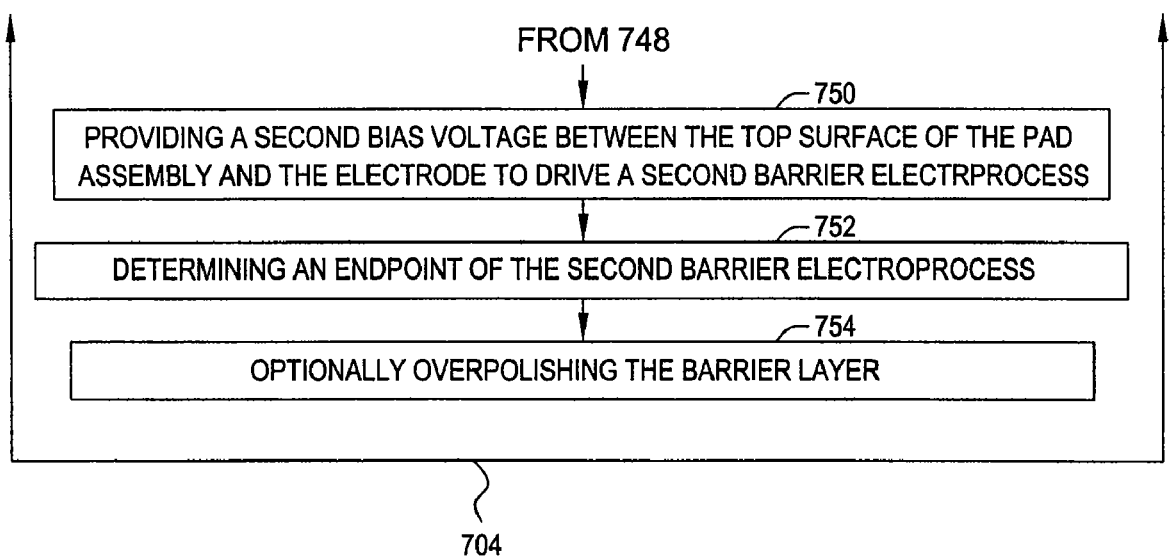

FIG. 7 depicts one embodiment of a method 700 for electroprocessing a substrate having an exposed conductive layer and an underlying barrier layer that may be practiced on the system 100 described above. The conductive layer may be tungsten, copper, a layer having both exposed tungsten and copper, and the like. The barrier layer may be ruthenium, tantalum, tantalum nitride, titanium, titanium nitride and the like. A dielectric layer, typically an oxide, generally underlies the barrier layer. The method 700 may also be practiced on other electroprocessing systems. The method 700 is generally stored in the memory 112 of the controller 108, typically as a software routine. The software routine may also be stored and/or executed by a second CPU (not shown) that is remotely located from the hardware being controlled by the CPU 110.

Although the process of the present invention is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware.

Figure 8:
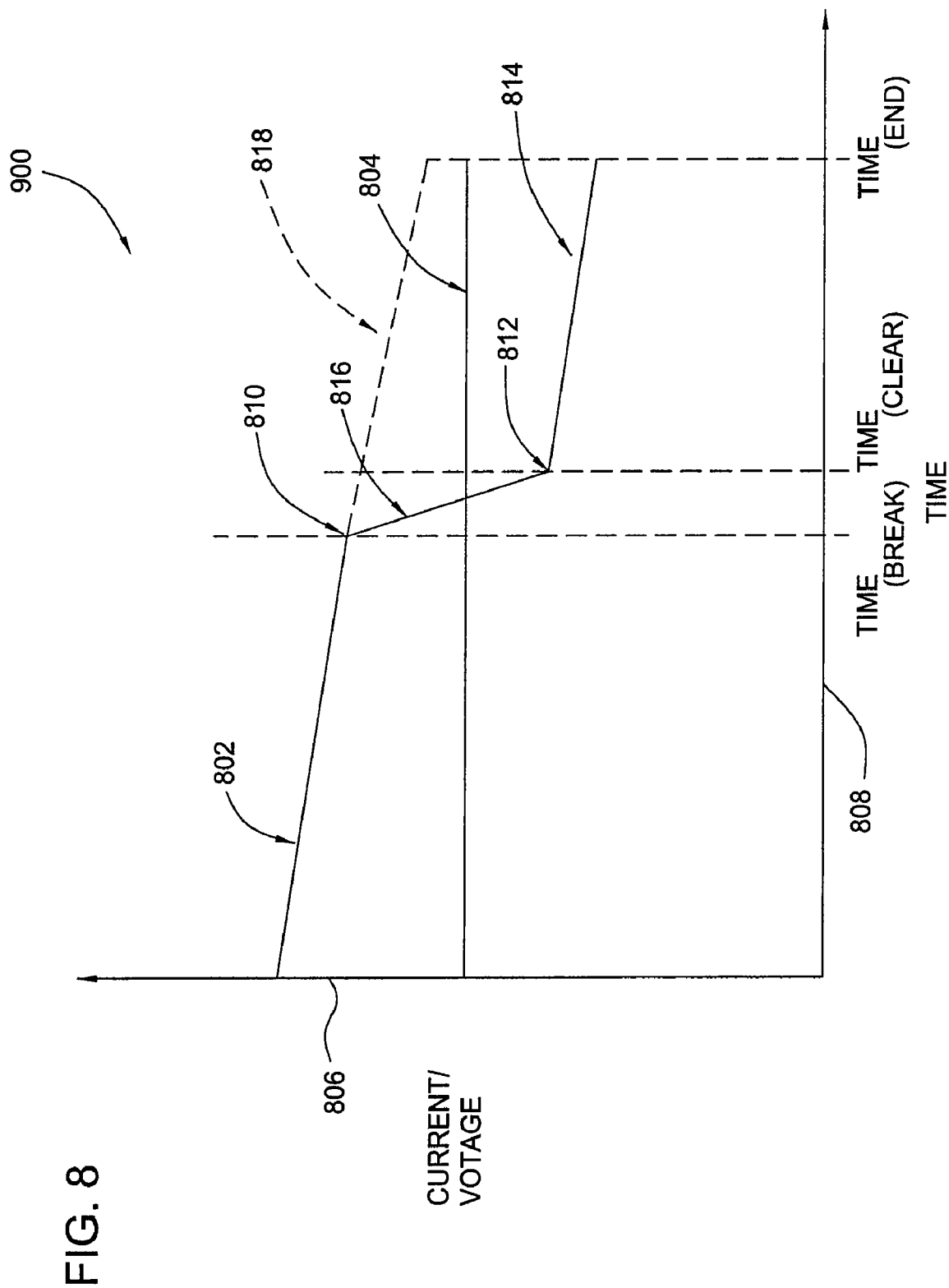
FIG. 8 depicts a graph illustrating current and voltage traces verse time for one embodiment of an exemplary electroprocessing method.

FIG. 8 depicts a graph 800 illustrating current 802 and voltage 804 traces over one embodiment of an exemplary removal or planarizing method as discussed below. Amplitude is plotted on the Y-axis 806 and time plotted on the X-axis 808.

The method 700 begins at step 702 by performing a bulk electrochemical process on the conductive layer formed on the substrate 122. In one embodiment, the conductive layer is a layer of tungsten about 6000-8000 Å thick. The bulk process step 702 is at the first ECMP station 128. The bulk process step 702 generally is terminated when the conductive layer is about 2000 to about 500 Å thick.

Next, a multi-step electrochemical clearance step 704 is performed to remove the remaining tungsten material to expose an underlying barrier layer, which, in one embodiment, is titanium or titanium nitride. The clearance step 704 may be performed on the first ECMP station 128, or one of the other ECMP stations 130, 132.

Following the clearance step 704, an electrochemical barrier removal step 706 is performed. Typically, the electrochemical barrier removal step 706 is performed on the third ECMP station 132, but may alternatively be performed one of the other ECMP stations 128, 130.

In one embodiment, the bulk processing step 702 begins at step 712 by moving the substrate 122 retained in the planarizing head 204 over the processing pad assembly 222 disposed in the first ECMP station 128. Although the pad assembly of FIGS. 2, 3A, 4A-C and 5, is utilized in one embodiment it is contemplated that pad and contact assemblies as described in FIGS. 3B-C may alternatively be utilized. At step 714, the planarizing head 204 is lowered toward the platen assembly 222 to place the substrate 122 in contact with the top surface of the pad assembly 222. The substrate 122 is urged against the pad assembly 222 with a force of less than about 2 pounds per square inch (psi). In one embodiment, the force is about 0.3 psi.

At step 716, relative motion between the substrate 122 and processing pad assembly 222 is provided. In one embodiment, the planarizing head 204 is rotated at about 30-60 revolutions per minute, while the pad assembly 222 is rotated at about 7-35 revolutions per minute.

At step 718, electrolyte is supplied to the processing pad assembly 604 to establish a conductive path therethrough between the substrate 122 and the electrode 614. The electrolyte typically includes at least one of sulfuric acid, phosphoric acid and ammonium citrate.

At step 720, the power source 242 provides a bias voltage between the top surface of the pad assembly 222 and the electrode 292. In one embodiment, the voltage is held at a constant magnitude less than about 3.5 volts. In another embodiment where copper is the material being processed, the voltage is held at a constant magnitude less than about 3.0 volts. One or more of the contact elements 250 of the pad assembly 222 are in contact with the substrate 122 and allows the voltage to be coupled thereto. Electrolyte filling the apertures 210 between the electrode 292 and the substrate 122 provides a conductive path between the power source 242 and substrate 122 to drive an electrochemical mechanical planarizing process that results in the removal of the tungsten material, or other conductive film disposed on the substrate, by an anodic dissolution method at step 722. The process of step 722 generally has a tungsten removal rate of about 4000 Å/min. The process of step 722 using the above stated parameters for copper processing generally has a copper removal rate of about 6000 Å/min.

At step 724, an endpoint of the bulk electroprocess is determined. The endpoint may be determined using a first metric of processing provided by the meter 244. The meter 244 may provide charge, voltage or current information utilized to determine the remaining thickness of the conductive material (e.g., the tungsten or copper layer) on the substrate. In another embodiment, optical techniques, such as an interferometer utilizing the sensor 254, may be utilized. The remaining thickness may be directly measured or calculated by subtracting the amount of material removed from a predetermined starting film thickness. In one embodiment, the endpoint is determined by comparing the charge removed from the substrate to a target charge amount for a predetermined area of the substrate. Examples of endpoint techniques that may be utilized are described in U.S. patent application Ser. No. 10/949,160, (entitled ENDPOINT COMPENSATION IN ELECTROPROCESSING, filed by Y. Wang et al.), filed Sep. 24, 2004, U.S. patent application Ser. No. 10/056,316, filed Jan. 22, 2002, and U.S. patent application Ser. No. 10/456,851, filed Jun. 6, 2002, all of which are hereby incorporated by reference in their entireties.

The step 724 is configured to detect the endpoint of the process prior to the breakthrough of the tungsten layer. In one embodiment, the remaining tungsten layer at step 724 has a thickness between about 500 to about 2000 Å.

The clearance processing step 704 begins at step 726 by moving the substrate 122 retained in the planarizing head 204 over the processing pad assembly 604 disposed in the second ECMP station 130. At step 728, the planarizing head 204 is lowered toward the platen assembly 602 to place the substrate 122 in contact with the top surface of the pad assembly 604. Although the pad assembly of FIG. 6 is utilized in one embodiment it is contemplated that pad and contact assemblies as described in FIGS. 2, 3A-C, 4A-C and 5 may alternatively be utilized. The substrate 122 is urged against the pad assembly 604 with a force in less than about 2 psi. In another embodiment, the force is less than or equal to about 0.3 psi.

At step 729, relative motion between the substrate 122 and processing pad assembly 222 is provided. In one embodiment, the planarizing head 204 is rotated at about 30-60 revolutions per minute, while the pad assembly 222 is rotated at about 7-35 revolutions per minute.

At step 730, electrolyte is supplied to the processing pad assembly 604 to establish a conductive path therethrough between the substrate 122 and the electrode 614. The electrolyte composition at step 730 is generally the same as the composition at step 722.

At a first clearance process step 731, a first bias voltage is provided by the power source 242 between the top surface of the pad assembly 604 and the electrode 614. The bias voltage, in one embodiment, is held at a constant magnitude in the range of about 1.5 to about 2.8 volts for tungsten processing, and in another embodiment is less 2.8 volts for copper processing. The potential difference causes a current to pass through the electrolyte filling the apertures 622 between the electrode 614 and the substrate 122 to drive an electrochemical mechanical planarizing process. The process of step 731 generally has a removal rate is about 1500 Å/min for tungsten and about 2000 Å/min for copper.

At step 732, an endpoint of the electroprocess step 731 is determined. The endpoint may be determined using a first metric of processing provided by the meter 244 or by the sensor 254. In one embodiment, the endpoint is determined by detecting a first discontinuity 810 in current sensed by the meter 244. The discontinuity 810 appears when the underlying layer begins to break through the conductive layer (e.g., the tungsten layer). As the underlying layer has a different resistivity than the tungsten layer, the resistance across the processing cell (i.e., from the conductive portion of the substrate to the electrode 292) changes as the area of tungsten layer relative to the exposed area of the underlying layer changes, thereby causing a change in the current.

In response to the endpoint detection at step 732, a second clearance process step 734 is preformed to remove the residual tungsten layer. The substrate is pressed against the pad assembly with a pressure less than about 2 psi, and in another embodiment, substrate is pressed against the pad assembly with a pressure less than or equal to about 0.3 psi. At step 734, a second voltage is provided from the power source 242. The second voltage may be the same or less than the voltage applied in step 730. In one embodiment, the second voltage is about 1.5 to about 2.8 volts. The voltage is held at a constant magnitude and passes through the electrolyte filling the apertures 622 between the electrode 614 and the substrate 122 to drive an electrochemical mechanical planarizing process. The process of step 734 generally has a removal rate of about 500 to about 1200 Å/min for both copper and tungsten processes.

At step 736, an endpoint of the second clearance step 734 is determined. The endpoint may be determined using a second metric of processing provided by the meter 244 or by the sensor 254. In one embodiment, the endpoint is determined by detecting a second discontinuity 812 in current sensed by the meter 244. The discontinuity 812 appears when the ratio of area between the underlying layer is fully exposed through the tungsten layer that remains in the features formed in the substrate 122 (e.g., plugs or other structure).

Optionally, a third clearance process step 738 may be performed to remove any remaining debris from the conductive layer. The third clearance process step 738 is typically a timed process, and is performed at the same or reduced voltage levels relative to the second clearance process step 734. In one embodiment, the third clearance process step 738 (also referred to as an overpolish step) has a duration of about 15 to about 30 seconds.

The electrochemical barrier removal step 706 begins at step 740 by moving the substrate 122 retained in the planarizing head 204 over the processing pad assembly 604 disposed in the third ECMP station 132. At step 741, the planarizing head 204 is lowered toward the platen assembly 602 to place the substrate 122 in contact with the top surface of the pad assembly 604. Although the pad assembly of FIG. 6 is utilized in one embodiment it is contemplated that pad and contact assemblies as described in FIGS. 2, 3A-C, 4A-C and 5 may alternatively be utilized. The barrier material exposed on the substrate 122 is urged against the pad assembly 604 with a force in less than about 2 psi, and in one embodiment, less than about 0.8 psi.

At step 742, relative motion between the substrate 122 and processing pad assembly 222 is provided. In one embodiment, the planarizing head 204 is rotated at about 30-60 revolutions per minute, while the pad assembly 222 is rotated at about 7-35 revolutions per minute.

At step 744, electrolyte is supplied to the processing pad assembly 604 to establish a conductive path therethrough between the substrate 122 and the electrode 614. The electrolyte composition utilized for barrier removal may be different than the electrolyte utilized for tungsten removal. In one embodiment, electrolyte composition provided at the third ECMP station 132 includes phosphoric or sulfuric acid and a catalyst. The electrolyte may be adapted to prevent or inhibit oxide formation on the barrier layer. The catalyst is selected to activate the Ti or other barrier layer to react selectively with a complexing agent so that the barrier layer may be removed and/or dissolved easily with minimal or no removal of copper or tungsten. The electrolyte composition may additionally include pH adjusters and clelating agents, such as amino acids, organic amines and phthalic acid or other organic carbolic acids, picolinic acid or its derivatives. The electrolyte may optionally contain abrasives. Abrasives may be desirable to remove a portion of the underlying oxide layer.

At a first barrier process step 746, a bias voltage is provided from the power source 242 between the top surface of the pad assembly 604 and the electrode 614. The voltage is held at a constant magnitude in the range of about 1.5 to about 3.0 volts. A conductive path is established through the electrolyte filling the apertures 622 between the electrode 614 and the substrate 122 to drive an electrochemical mechanical planarizing process. The process of step 746 generally has a titanium removal rate of about 500 to about 1000 Å/min. Removal rates for other barrier materials are comparable.

At step 748, an endpoint of the electroprocess step 746 is determined. The endpoint may be determined using a first metric of processing provided by the meter 244 or by the sensor 254. The current and voltage traces of the electrochemical barrier removal step 706 are similar is form to the traces 802, 804 of FIG. 8, and as such, have been omitted for brevity. In one embodiment, the endpoint of step 748 is determined by detecting a first discontinuity in current sensed by the meter 244. The first discontinuity appears when the underlying layer (typically an oxide) begins to break through the barrier layer. As the underlying oxide layer has a different resistivity than the barrier layer, the change in resistance across the processing cell is indicative of the breakthrough of the barrier layer.

In response to the endpoint detection at step 748, a second clearance process step 750 is performed to remove the residual tungsten layer. At step 750, a second voltage is provided from the power source 242. The second voltage may be the same or less than the voltage of the first barrier clearance step 746. In one embodiment, the voltage is about 1.5 to about 2.5 volts. The voltage is held at a constant magnitude and causes a current to pass through the electrolyte filling the apertures 622 between the electrode 614 and the substrate 122 to drive an electrochemical mechanical planarizing process. The process of step 750 generally has a removal rate less than the first barrier removal step 746 of about 300 to about 600 Å/min.

At step 752, an endpoint of the electroprocess step 750 is determined. The endpoint may be determined using a second metric of processing provided by the meter 244 or by the sensor 254. In one embodiment, the endpoint is determined by detecting a second discontinuity in current sensed by the meter 244. The second discontinuity appears when the ratio of area between the oxide layer is fully exposed through barrier layer that remains in the features formed in the substrate 122.

Optionally, a third clearance process step 754 may be performed to remove any remaining debris from the barrier layer. The third clearance process step 754 is typically a timed process, and is performed at the same or reduced voltage levels relative to the second clearance process step 750. In one embodiment, the third clearance process step 754 (also referred to as an overpolish step) has a duration of about 15 to about 30 seconds.

Thus, the present invention provides an improved apparatus and method for electrochemically planarizing a substrate. The apparatus advantageously facilitates efficient bulk and residual metal and barrier materials removal from a substrate using a single tool. Utilization of electrochemical processes for full sequence metal and barrier removal advantageously provides low erosion and dishing of conductors while minimizing oxide loss during processing. It is contemplated that a method and apparatus as described by the teachings herein may be utilized to deposit materials onto a substrate by reversing the polarity of the bias applied to the electrode and the substrate.

While the foregoing is directed to embodiments of the invention, other and further embodiments of the invention may be devised without departing from the basic scope thereof, and the scope thereof is determined by the claims that follow.

What is claimed is:

1. A method for electroprocessing a substrate, comprising:
    establishing an electrically-conductive path through an electrolyte between an exposed layer of barrier material on the substrate and an electrode;
    pressing the substrate against a processing pad assembly;
    providing motion between the substrate and pad assembly in contact therewith;
    detecting an endpoint of a first electrochemical processing step at or just prior to breakthrough of the exposed layer of barrier material;
    electrochemically processing the exposed layer of barrier material in a second electrochemical processing step in the barrier processing station;
    detecting an endpoint of the second electrochemical processing step; and
    electrochemically removing a portion of the exposed layer during the electrochemical processing steps in a barrier processing station, wherein the electrochemical processing steps of removing the exposed layer further comprises:
        detecting a first endpoint;
        electroprocessing the substrate at a slower rate;
        detecting a second endpoint indicative of residual barrier material being cleared from the substrate; and
        overpolishing the substrate after detection of the second endpoint.

2. The method of claim 1, wherein the step of establishing a conductive path further comprises:
    flowing electrolyte from below the electrode through the processing pad assembly into contact with the substrate.

3. The method of claim 1, wherein the step of detecting the first endpoint further comprises:
    detecting a first discontinuity in a current passing between the substrate and the electrode.

4. The method of claim 3, wherein the step of detecting the second endpoint further comprises:
    detecting a second discontinuity in the current passing between the substrate and the electrode.

5. A method for electroprocessing a substrate, comprising:
    establishing an electrically-conductive path through an electrolyte between an exposed layer of barrier material on the substrate and an electrode;
    pressing the substrate against a processing pad assembly;
    providing motion between the substrate and pad assembly in contact therewith;
    rotating the pad assembly at a rate less than about 50 revolutions per minute;
    detecting an endpoint of a first electrochemical processing step at or just prior to breakthrough of the exposed layer of barrier material;
    electrochemically processing the exposed layer of barrier material in a second electrochemical processing step in the barrier processing station;
    detecting an endpoint of the second electrochemical processing step; and
    electrochemically removing a portion of the exposed layer during the electrochemical processing steps in a barrier processing station.

6. A method for electroprocessing a substrate, comprising:
    establishing an electrically-conductive path through an electrolyte between an exposed layer of barrier material on the substrate and an electrode, wherein the electrolyte further comprises a catalyst and at least one of sulfuric acid, phosphoric acid, amino acid, organic amine, phthalic acid, organic carbolic acid, or picolinic acid or its derivatives;
    pressing the substrate against a processing pad assembly;
    providing motion between the substrate and pad assembly in contact therewith;
    detecting an endpoint of a first electrochemical processing step at or just prior to breakthrough of the exposed layer of barrier material;
    electrochemically processing the exposed layer of barrier material in a second electrochemical processing step in the barrier processing station;
    detecting an endpoint of the second electrochemical processing step; and
    electrochemically removing a portion of the exposed layer during the electrochemical processing steps in a barrier processing station.

7. The method of claim 1, wherein the barrier material is at least one of ruthenium, titanium, titanium nitride, tantalum and tantalum nitride.

8. A method for electroprocessing a substrate, comprising:
    establishing an electrically-conductive path through an electrolyte between an exposed layer of barrier material on the substrate and an electrode;
    establishing relative motion between the substrate and the pad assembly while the substrate and the pad assembly are in contact;
    rotating the pad assembly at a rate less than about 50 revolutions per minute;
    electrochemically removing a portion of the exposed layer during a first electrochemical processing step in a barrier processing station disposed within an enclosure of a processing system;
    removing, within the processing system, a conductive layer, if any, remaining over the barrier layer;
    detecting an endpoint of the first electrochemical processing step at or just prior to breakthrough of the exposed layer of barrier material;
    removing, within the processing system, a conductive layer remaining over the barrier layer;
    electrochemically processing the exposed layer of barrier material in a second electrochemical processing step in the barrier processing station;
    detecting an endpoint of the second electrochemical processing step; and
    electrochemically removing a portion of the exposed layer during the electrochemical processing steps in a barrier processing station.

9. The method of claim 8, wherein the step of removing further comprises:
electrochemically processing the conductive layer.

10. The method of claim 8 further comprising:
transferring the substrate between a first electrochemical processing station to the barrier processing station.

11. The method of claim 8, wherein the conductive layer is tungsten.

12. The method of claim 8, wherein the conductive layer is copper.

13. The method of claim 8, wherein the barrier material is at least one of ruthenium, titanium, titanium nitride, tantalum and tantalum nitride.

* * * * *

UNITED STATES PATENT AND TRADEMARK OFFICE
CERTIFICATE OF CORRECTION

| | |
|---|---|
| PATENT NO. | : 7,446,041 B2 |
| APPLICATION NO. | : 11/425682 |
| DATED | : November 4, 2008 |
| INVENTOR(S) | : Liu et al. |

Page 1 of 1

It is certified that error appears in the above-identified patent and that said Letters Patent is hereby corrected as shown below:

In column 12, line 16, delete "clelating" and insert -- chelating --, therefor.

Signed and Sealed this

Twenty-fourth Day of February, 2009

JOHN DOLL
*Acting Director of the United States Patent and Trademark Office*